(12) United States Patent
Ueda

(10) Patent No.: US 10,498,912 B2
(45) Date of Patent: Dec. 3, 2019

(54) IMAGE FORMING DEVICE, MULTIFUNCTION PERIPHERAL, AND CONTROL METHOD OF IMAGE FORMING DEVICE

(71) Applicant: SHARP KABUSHIKI KAISHA, Sakai, Osaka (JP)

(72) Inventor: Nobuyuki Ueda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/197,219

(22) Filed: Nov. 20, 2018

(65) Prior Publication Data

US 2019/0158680 A1 May 23, 2019

(30) Foreign Application Priority Data

Nov. 20, 2017 (JP) .................................. 2017-222859

(51) Int. Cl.
H04N 1/00 (2006.01)

(52) U.S. Cl.
CPC ....... *H04N 1/0048* (2013.01); *H04N 1/00697* (2013.01); *H04N 1/00724* (2013.01); *H04N 1/00779* (2013.01)

(58) Field of Classification Search
CPC .......................... H04N 1/0048; H04N 1/00697
See application file for complete search history.

(56) References Cited

U.S. PATENT DOCUMENTS

| | | | | |
|---|---|---|---|---|
| 5,467,434 A | * | 11/1995 | Hower, Jr. ............ | G06F 3/1205 358/1.13 |
| 7,847,961 B2 | * | 12/2010 | Takatsuna .............. | G06K 15/00 358/1.1 |
| 2004/0141203 A1 | * | 7/2004 | Honma .................. | G06F 3/1205 358/1.15 |
| 2005/0088679 A1 | * | 4/2005 | Martin .................. | G06F 21/608 358/1.14 |
| 2007/0263242 A1 | * | 11/2007 | Takahashi .......... | G03G 15/6508 358/1.14 |

FOREIGN PATENT DOCUMENTS

| | | |
|---|---|---|
| JP | 2015-174756 A | 10/2015 |
| JP | 2015-182443 A | 10/2015 |

* cited by examiner

*Primary Examiner* — Ibrahim Siddo
(74) *Attorney, Agent, or Firm* — ScienBiziP, P.C.

(57) ABSTRACT

Included is a print permitting/forbidding control unit configured to decide actual permitting/forbidding regarding printing regarding each of sheet feed trays, based on any one of, or a combination of any two or more of, settings of permitting/forbidding printing with regard to each sheet feed tray, setting's of permitting/forbidding printing with regard to each sheet size, and settings of permitting/forbidding printing with regard to each sheet type. At least part of settings used by the print permitting/forbidding control unit to decide actual permitting/forbidding regarding printing, out of the settings of permitting/forbidding printing with regard to each sheet feed tray, settings of permitting/forbidding printing with regard to each sheet size, and settings of permitting/forbidding printing with regard to each sheet type, can be made to differ for each user.

15 Claims, 38 Drawing Sheets

FIG. 1A

| USER SETTINGS | | |
|---|---|---|
| TRAY AUTHORIZATION SETTINGS<br>CHECK USERS TO IMPART TRAY AUTHORITY TO | | |
| | TRAY<br>OPEN/CLOSE | PRINT |
| TARO YAMADA | ☑ | ☑ |
| HANAKO YAMADA | ☐ | ☐ |

FIG. 1B

| TRAY SETTINGS | | |
|---|---|---|
| TRAY ATTRIBUTE IMPARTATION SETTINGS<br>CHECK CONTENTS FOR IMPARTING TRAY ATTRIBUTES | | |
| | TRAY<br>OPEN/CLOSE | PRINT |
| TRAY 1 | ☑ | ☑ |
| TRAY 2 | ☐ | ☐ |
| TRAY 3 | ☐ | ☐ |
| TRAY 4 | ☐ | ☐ |
| TRAY 5 | ☐ | ☐ |

FIG. 1C

| SHEET TYPE SETTINGS | | |
|---|---|---|
| SHEET TYPE ATTRIBUTE IMPARTATION SETTINGS<br>CHECK CONTENTS FOR IMPARTING SHEET TYPE ATTRIBUTES | | |
| | TRAY<br>OPEN/CLOSE | PRINT |
| PLAIN PAPER | ☑ | ☑ |
| HEAVY PAPER | ☐ | ☐ |
| GLOSSY PAPER | ☑ | ☐ |
| LABEL SHEET | ☐ | ☐ |
| OHP SHEET | ☐ | ☐ |

FIG. 1D

| SHEET SIZE SETTINGS | | |
|---|---|---|
| SHEET SIZE ATTRIBUTE IMPARTATION SETTINGS<br>CHECK CONTENTS FOR IMPARTING SHEET SIZE ATTRIBUTES | | |
| | TRAY<br>OPEN/CLOSE | PRINT |
| A4 | ☑ | ☑ |
| A3 | ☐ | ☐ |
| B5 | ☐ | ☐ |
| POSTCARD | ☑ | ☐ |
| DOUBLE POSTCARD | ☐ | ☐ |

FIG. 1E

| SHEET TYPE SETTINGS | | |
|---|---|---|
| SHEET TYPE DETAILED SETTINGS | | |
| NAME | CUSTOM SHEET | |
| GRAMMAGE | 120 g/m² | |
| FRONT/REAR ATTRIBUTES | ☐ | ☐ |
| TRAY OPEN/CLOSE | ☑ | ☐ |
| PRINT | ☐ | ☐ |

FIG. 2A

| TRAY | TRAY OPEN/CLOSE PERMITTED/FORBIDDEN | PRINT PERMITTED/FORBIDDEN |
|---|---|---|
| TRAY #1 | PERMITTED | PERMITTED |
| TRAY #2 | PERMITTED | PERMITTED |
| TRAY #3 | FORBIDDEN | FORBIDDEN |
| TRAY #4 | PERMITTED | PERMITTED |
| TRAY #5 | PERMITTED | PERMITTED |
| MANUAL FEED | PERMITTED | PERMITTED |

FIG. 2B

| TRAY | SHEET TYPE | SHEET SIZE |
|---|---|---|
| TRAY #1 | HEAVY PAPER | A4 |
| TRAY #2 | PLAIN PAPER | B4 |
| TRAY #3 | HEAVY PAPER | B5 |
| TRAY #4 | PLAIN PAPER | A4R |
| TRAY #5 | GLOSSY PAPER | A4 |
| MANUAL FEED | HEAVY PAPER | POSTCARD |

FIG. 2C

TRAY OPEN/CLOSE

| | TRAY | TRAY OPEN/CLOSE PERMITTED/FORBIDDEN |
|---|---|---|
| TRAY #1 | PERMITTED | PERMITTED |
| TRAY #2 | PERMITTED | PERMITTED |
| TRAY #3 | FORBIDDEN | FORBIDDEN |
| TRAY #4 | PERMITTED | PERMITTED |
| TRAY #5 | PERMITTED | PERMITTED |
| MANUAL FEED | PERMITTED | PERMITTED |

FIG. 2D

PRINT

| | TRAY | PRINT PERMITTED/FORBIDDEN |
|---|---|---|
| TRAY #1 | PERMITTED | PERMITTED |
| TRAY #2 | PERMITTED | PERMITTED |
| TRAY #3 | FORBIDDEN | FORBIDDEN |
| TRAY #4 | PERMITTED | PERMITTED |
| TRAY #5 | PERMITTED | PERMITTED |
| MANUAL FEED | PERMITTED | PERMITTED |

FIG. 2E

| IMAGE DISPLAY |
|---|
| A4 |
| B4 |
| BLANK |
| A4R |
| A4 |
| POSTCARD |

FIG. 3A

| SHEET TYPE | TRAY OPEN/CLOSE PERMITTED/FORBIDDEN | PRINT PERMITTED/FORBIDDEN |
|---|---|---|
| PLAIN PAPER | PERMITTED | PERMITTED |
| HEAVY PAPER | PERMITTED | PERMITTED |
| GLOSSY PAPER | FORBIDDEN | PERMITTED |
| LABEL SHEET | PERMITTED | PERMITTED |
| OHP SHEET | PERMITTED | PERMITTED |

FIG. 3B

| TRAY | SHEET TYPE | SHEET SIZE |
|---|---|---|
| TRAY #1 | HEAVY PAPER | A4 |
| TRAY #2 | PLAIN PAPER | B4 |
| TRAY #3 | HEAVY PAPER | B5 |
| TRAY #4 | PLAIN PAPER | A4R |
| TRAY #5 | GLOSSY PAPER | A4 |
| MANUAL FEED | HEAVY PAPER | POSTCARD |

FIG. 3C

TRAY OPEN/CLOSE

|  | SHEET TYPE | TRAY OPEN/CLOSE PERMITTED/FORBIDDEN |
|---|---|---|
| TRAY #1 | PERMITTED | PERMITTED |
| TRAY #2 | PERMITTED | PERMITTED |
| TRAY #3 | PERMITTED | PERMITTED |
| TRAY #4 | PERMITTED | PERMITTED |
| TRAY #5 | FORBIDDEN | FORBIDDEN |
| MANUAL FEED | PERMITTED | PERMITTED |

FIG. 3D

PRINT

|  | SHEET TYPE | PRINT PERMITTED/FORBIDDEN |
|---|---|---|
| TRAY #1 | PERMITTED | PERMITTED |
| TRAY #2 | PERMITTED | PERMITTED |
| TRAY #3 | PERMITTED | PERMITTED |
| TRAY #4 | PERMITTED | PERMITTED |
| TRAY #5 | PERMITTED | PERMITTED |
| MANUAL FEED | PERMITTED | PERMITTED |

FIG. 3E

| IMAGE DISPLAY |
|---|
| A4 |
| B4 |
| B4 |
| A4R |
| BLANK |
| POSTCARD |

FIG. 4A

| SHEET SIZE | TRAY OPEN/CLOSE PERMITTED/FORBIDDEN | PRINT PERMITTED/FORBIDDEN |
|---|---|---|
| A3 | PERMITTED | PERMITTED |
| A4 | PERMITTED | PERMITTED |
| B4 | PERMITTED | PERMITTED |
| B5 | PERMITTED | PERMITTED |
| A4R | FORBIDDEN | FORBIDDEN |
| POSTCARD | PERMITTED | PERMITTED |
| DOUBLE POSTCARD | PERMITTED | PERMITTED |

FIG. 4B

| TRAY | SHEET TYPE | SHEET SIZE |
|---|---|---|
| TRAY #1 | HEAVY PAPER | A4 |
| TRAY #2 | PLAIN PAPER | B4 |
| TRAY #3 | HEAVY PAPER | B5 |
| TRAY #4 | PLAIN PAPER | A4R |
| TRAY #5 | GLOSSY PAPER | A4 |
| MANUAL FEED | HEAVY PAPER | POSTCARD |

FIG. 4C

TRAY OPEN/CLOSE

|  | SHEET SIZE | TRAY OPEN/CLOSE PERMITTED/FORBIDDEN |
|---|---|---|
| TRAY #1 | PERMITTED | PERMITTED |
| TRAY #2 | PERMITTED | PERMITTED |
| TRAY #3 | PERMITTED | PERMITTED |
| TRAY #4 | FORBIDDEN | FORBIDDEN |
| TRAY #5 | PERMITTED | PERMITTED |
| MANUAL FEED | PERMITTED | PERMITTED |

FIG. 4D

PRINT

|  | SHEET TYPE | PRINT PERMITTED/FORBIDDEN |
|---|---|---|
| TRAY #1 | PERMITTED | PERMITTED |
| TRAY #2 | PERMITTED | PERMITTED |
| TRAY #3 | PERMITTED | PERMITTED |
| TRAY #4 | FORBIDDEN | FORBIDDEN |
| TRAY #5 | PERMITTED | PERMITTED |
| MANUAL FEED | PERMITTED | PERMITTED |

FIG. 4E

| IMAGE DISPLAY |
|---|
| A4 |
| B4 |
| B5 |
| BLANK |
| A4 |
| POSTCARD |

FIG. 5A

| SHEET SIZE | TRAY OPEN/CLOSE PERMITTED/FORBIDDEN | PRINT PERMITTED/FORBIDDEN |
|---|---|---|
| A3 | PERMITTED | PERMITTED |
| A4 | PERMITTED | PERMITTED |
| B4 | PERMITTED | PERMITTED |
| B5 | PERMITTED | PERMITTED |
| A4R | FORBIDDEN | FORBIDDEN |
| POSTCARD | PERMITTED | PERMITTED |
| DOUBLE POSTCARD | PERMITTED | PERMITTED |

FIG. 5B

| SHEET TYPE | TRAY OPEN/CLOSE PERMITTED/FORBIDDEN | PRINT PERMITTED/FORBIDDEN |
|---|---|---|
| PLAIN PAPER | PERMITTED | PERMITTED |
| HEAVY PAPER | PERMITTED | PERMITTED |
| GLOSSY PAPER | FORBIDDEN | PERMITTED |
| LABEL SHEET | PERMITTED | PERMITTED |
| OHP SHEET | PERMITTED | PERMITTED |

FIG. 5C

| TRAY | SHEET TYPE | SHEET SIZE |
|---|---|---|
| TRAY #1 | HEAVY PAPER | A4 |
| TRAY #2 | PLAIN PAPER | B4 |
| TRAY #3 | HEAVY PAPER | B5 |
| TRAY #4 | PLAIN PAPER | A4R |
| TRAY #5 | GLOSSY PAPER | A4 |
| MANUAL FEED | HEAVY PAPER | POSTCARD |

FIG. 5D

TRAY OPEN/CLOSE

|  | SHEET TYPE | SHEET SIZE | TRAY OPEN/CLOSE PERMITTED/FORBIDDEN |
|---|---|---|---|
| TRAY #1 | PERMITTED | PERMITTED | PERMITTED |
| TRAY #2 | PERMITTED | PERMITTED | PERMITTED |
| TRAY #3 | PERMITTED | PERMITTED | PERMITTED |
| TRAY #4 | PERMITTED | FORBIDDEN | FORBIDDEN |
| TRAY #5 | FORBIDDEN | PERMITTED | FORBIDDEN |
| MANUAL FEED | PERMITTED | PERMITTED | PERMITTED |

FIG. 5E

PRINT

|  | SHEET TYPE | SHEET SIZE | PRINT PERMITTED/FORBIDDEN |
|---|---|---|---|
| TRAY #1 | PERMITTED | PERMITTED | PERMITTED |
| TRAY #2 | PERMITTED | PERMITTED | PERMITTED |
| TRAY #3 | PERMITTED | PERMITTED | PERMITTED |
| TRAY #4 | PERMITTED | FORBIDDEN | FORBIDDEN |
| TRAY #5 | PERMITTED | PERMITTED | PERMITTED |
| MANUAL FEED | PERMITTED | PERMITTED | PERMITTED |

FIG. 5F

| IMAGE DISPLAY |
|---|
| A4 |
| B4 |
| B5 |
| FIG. 2E |
| BLANK |
| POSTCARD |

FIG. 6A

| SHEET SIZE | TRAY OPEN/CLOSE PERMITTED/FORBIDDEN | PRINT PERMITTED/FORBIDDEN |
|---|---|---|
| A3 | PERMITTED | PERMITTED |
| A4 | PERMITTED | PERMITTED |
| B4 | PERMITTED | PERMITTED |
| B5 | PERMITTED | PERMITTED |
| A4R | FORBIDDEN | FORBIDDEN |
| POSTCARD | PERMITTED | PERMITTED |
| DOUBLE POSTCARD | PERMITTED | PERMITTED |

FIG. 6B

| SHEET TYPE | TRAY OPEN/CLOSE PERMITTED/FORBIDDEN | PRINT PERMITTED/FORBIDDEN |
|---|---|---|
| PLAIN PAPER | PERMITTED | PERMITTED |
| HEAVY PAPER | PERMITTED | PERMITTED |
| GLOSSY PAPER | FORBIDDEN | PERMITTED |
| LABEL SHEET | PERMITTED | PERMITTED |
| OHP SHEET | PERMITTED | PERMITTED |
| ORIGINAL #1 | PERMITTED | PERMITTED |
| ORIGINAL #2 | FORBIDDEN | FORBIDDEN |

FIG. 6C

| TRAY | SHEET TYPE | SHEET SIZE |
|---|---|---|
| TRAY #1 | HEAVY PAPER | A4 |
| TRAY #2 | ORIGINAL #1 | N/A |
| TRAY #3 | ORIGINAL #2 | N/A |
| TRAY #4 | PLAIN PAPER | A4R |
| TRAY #5 | GLOSSY PAPER | A4 |
| MANUAL FEED | HEAVY PAPER | POSTCARD |

FIG. 6D

TRAY OPEN/CLOSE

| | SHEET TYPE | SHEET SIZE | TRAY OPEN/CLOSE PERMITTED/FORBIDDEN |
|---|---|---|---|
| TRAY #1 | PERMITTED | PERMITTED | PERMITTED |
| TRAY #2 | PERMITTED | N/A | PERMITTED |
| TRAY #3 | FORBIDDEN | N/A | FORBIDDEN |
| TRAY #4 | PERMITTED | FORBIDDEN | FORBIDDEN |
| TRAY #5 | FORBIDDEN | PERMITTED | FORBIDDEN |
| MANUAL FEED | PERMITTED | PERMITTED | PERMITTED |

FIG. 6E

PRINT

| | SHEET TYPE | SHEET SIZE | PRINT PERMITTED/FORBIDDEN |
|---|---|---|---|
| TRAY #1 | PERMITTED | PERMITTED | PERMITTED |
| TRAY #2 | PERMITTED | N/A | PERMITTED |
| TRAY #3 | FORBIDDEN | N/A | FORBIDDEN |
| TRAY #4 | PERMITTED | FORBIDDEN | FORBIDDEN |
| TRAY #5 | PERMITTED | PERMITTED | PERMITTED |
| MANUAL FEED | PERMITTED | PERMITTED | PERMITTED |

FIG. 6F

| IMAGE DISPLAY |
|---|
| A4 |
| ORIGINAL #1 |
| BLANK |
| BLANK |
| BLANK |
| POSTCARD |

FIG. 7A

| SHEET SIZE | TRAY OPEN/CLOSE PERMITTED/FORBIDDEN | PRINT PERMITTED/FORBIDDEN |
|---|---|---|
| A3 | PERMITTED | PERMITTED |
| A4 | PERMITTED | PERMITTED |
| B4 | PERMITTED | PERMITTED |
| B5 | PERMITTED | PERMITTED |
| A4R | FORBIDDEN | FORBIDDEN |
| POSTCARD | PERMITTED | PERMITTED |
| DOUBLE POSTCARD | PERMITTED | PERMITTED |

FIG. 7B

| SHEET TYPE | TRAY OPEN/CLOSE PERMITTED/FORBIDDEN | PRINT PERMITTED/FORBIDDEN |
|---|---|---|
| PLAIN PAPER | PERMITTED | PERMITTED |
| HEAVY PAPER | PERMITTED | PERMITTED |
| GLOSSY PAPER | FORBIDDEN | PERMITTED |
| LABEL SHEET | PERMITTED | PERMITTED |
| OHP SHEET | PERMITTED | PERMITTED |

FIG. 7C

| TRAY | TRAY OPEN/CLOSE PERMITTED/FORBIDDEN | PRINT PERMITTED/FORBIDDEN |
|---|---|---|
| TRAY #1 | PERMITTED | PERMITTED |
| TRAY #2 | PERMITTED | PERMITTED |
| TRAY #3 | FORBIDDEN | FORBIDDEN |
| TRAY #4 | PERMITTED | PERMITTED |
| TRAY #5 | PERMITTED | PERMITTED |
| MANUAL FEED | PERMITTED | PERMITTED |

FIG. 7D

| TRAY | SHEET TYPE | SHEET SIZE |
|---|---|---|
| TRAY #1 | HEAVY PAPER | A4 |
| TRAY #2 | PLAIN PAPER | B4 |
| TRAY #3 | HEAVY PAPER | B5 |
| TRAY #4 | PLAIN PAPER | A4R |
| TRAY #5 | GLOSSY PAPER | A4 |
| MANUAL FEED | HEAVY PAPER | POSTCARD |

FIG. 7E

TRAY OPEN/CLOSE

| TRAY | SHEET TYPE | SHEET SIZE | TRAY OPEN/CLOSE PERMITTED/FORBIDDEN |
|---|---|---|---|
| TRAY #1 | PERMITTED | PERMITTED | PERMITTED |
| TRAY #2 | PERMITTED | PERMITTED | PERMITTED |
| TRAY #3 | FORBIDDEN | PERMITTED | FORBIDDEN |
| TRAY #4 | PERMITTED | FORBIDDEN | FORBIDDEN |
| TRAY #5 | PERMITTED | PERMITTED | FORBIDDEN |
| MANUAL FEED | PERMITTED | PERMITTED | PERMITTED |

FIG. 7F

| PRINT | | | |
|---|---|---|---|
| TRAY | SHEET TYPE | SHEET SIZE | PRINT PERMITTED/FORBIDDEN |
| TRAY #1 PERMITTED | PERMITTED | PERMITTED | PERMITTED |
| TRAY #2 PERMITTED | PERMITTED | PERMITTED | PERMITTED |
| TRAY #3 FORBIDDEN | PERMITTED | PERMITTED | FORBIDDEN |
| TRAY #4 PERMITTED | PERMITTED | FORBIDDEN | FORBIDDEN |
| TRAY #5 PERMITTED | PERMITTED | PERMITTED | PERMITTED |
| MANUAL FEED PERMITTED | PERMITTED | PERMITTED | PERMITTED |

FIG. 7G

| IMAGE DISPLAY |
|---|
| A4 |
| B4 |
| BLANK |
| BLANK |
| BLANK |
| POSTCARD |

FIG. 8A

| SHEET SIZE | TRAY OPEN/CLOSE PERMITTED/FORBIDDEN | PRINT PERMITTED/FORBIDDEN |
|---|---|---|
| A3 | PERMITTED | PERMITTED |
| A4 | PERMITTED | PERMITTED |
| B4 | PERMITTED | PERMITTED |
| B5 | PERMITTED | PERMITTED |
| A4R | FORBIDDEN | FORBIDDEN |
| POSTCARD | PERMITTED | PERMITTED |
| DOUBLE POSTCARD | PERMITTED | PERMITTED |

FIG. 8B

| SHEET TYPE | TRAY OPEN/CLOSE PERMITTED/FORBIDDEN | PRINT PERMITTED/FORBIDDEN |
|---|---|---|
| PLAIN PAPER | PERMITTED | PERMITTED |
| HEAVY PAPER | PERMITTED | PERMITTED |
| GLOSSY PAPER | FORBIDDEN | PERMITTED |
| LABEL SHEET | PERMITTED | PERMITTED |
| OHP SHEET | PERMITTED | PERMITTED |
| ORIGINAL #1 | PERMITTED | PERMITTED |
| ORIGINAL #2 | FORBIDDEN | FORBIDDEN |

FIG. 8C

| TRAY | TRAY OPEN/CLOSE PERMITTED/FORBIDDEN | PRINT PERMITTED/FORBIDDEN |
|---|---|---|
| TRAY #1 | PERMITTED | PERMITTED |
| TRAY #2 | PERMITTED | PERMITTED |
| TRAY #3 | FORBIDDEN | FORBIDDEN |
| TRAY #4 | PERMITTED | PERMITTED |
| TRAY #5 | PERMITTED | PERMITTED |
| MANUAL FEED | PERMITTED | PERMITTED |

FIG. 8D

| TRAY | SHEET TYPE | SHEET SIZE |
|---|---|---|
| TRAY #1 | HEAVY PAPER | A4 |
| TRAY #2 | ORIGINAL #1 | N/A |
| TRAY #3 | ORIGINAL #2 | N/A |
| TRAY #4 | PLAIN PAPER | A4R |
| TRAY #5 | GLOSSY PAPER | A4 |
| MANUAL FEED | HEAVY PAPER | POSTCARD |

FIG. 8E

TRAY OPEN/CLOSE

| TRAY | SHEET TYPE | SHEET SIZE | TRAY OPEN/CLOSE PERMITTED/FORBIDDEN |
|---|---|---|---|
| TRAY #1 | PERMITTED | PERMITTED | PERMITTED |
| TRAY #2 | PERMITTED | N/A | PERMITTED |
| TRAY #3 | FORBIDDEN | N/A | FORBIDDEN |
| TRAY #4 | PERMITTED | FORBIDDEN | FORBIDDEN |
| TRAY #5 | FORBIDDEN | PERMITTED | FORBIDDEN |
| MANUAL FEED | PERMITTED | PERMITTED | PERMITTED |

FIG. 8F

PRINT

| TRAY | SHEET TYPE | SHEET SIZE | PRINT PERMITTED/FORBIDDEN |
|---|---|---|---|
| TRAY #1 | PERMITTED | PERMITTED | PERMITTED |
| TRAY #2 | PERMITTED | N/A | PERMITTED |
| TRAY #3 | FORBIDDEN | N/A | FORBIDDEN |
| TRAY #4 | PERMITTED | FORBIDDEN | FORBIDDEN |
| TRAY #5 | PERMITTED | PERMITTED | PERMITTED |
| MANUAL FEED | PERMITTED | PERMITTED | PERMITTED |

FIG. 8G

| IMAGE DISPLAY |
|---|
| A4 |
| ORIGINAL #1 |
| BLANK |
| BLANK |
| BLANK |
| POSTCARD |

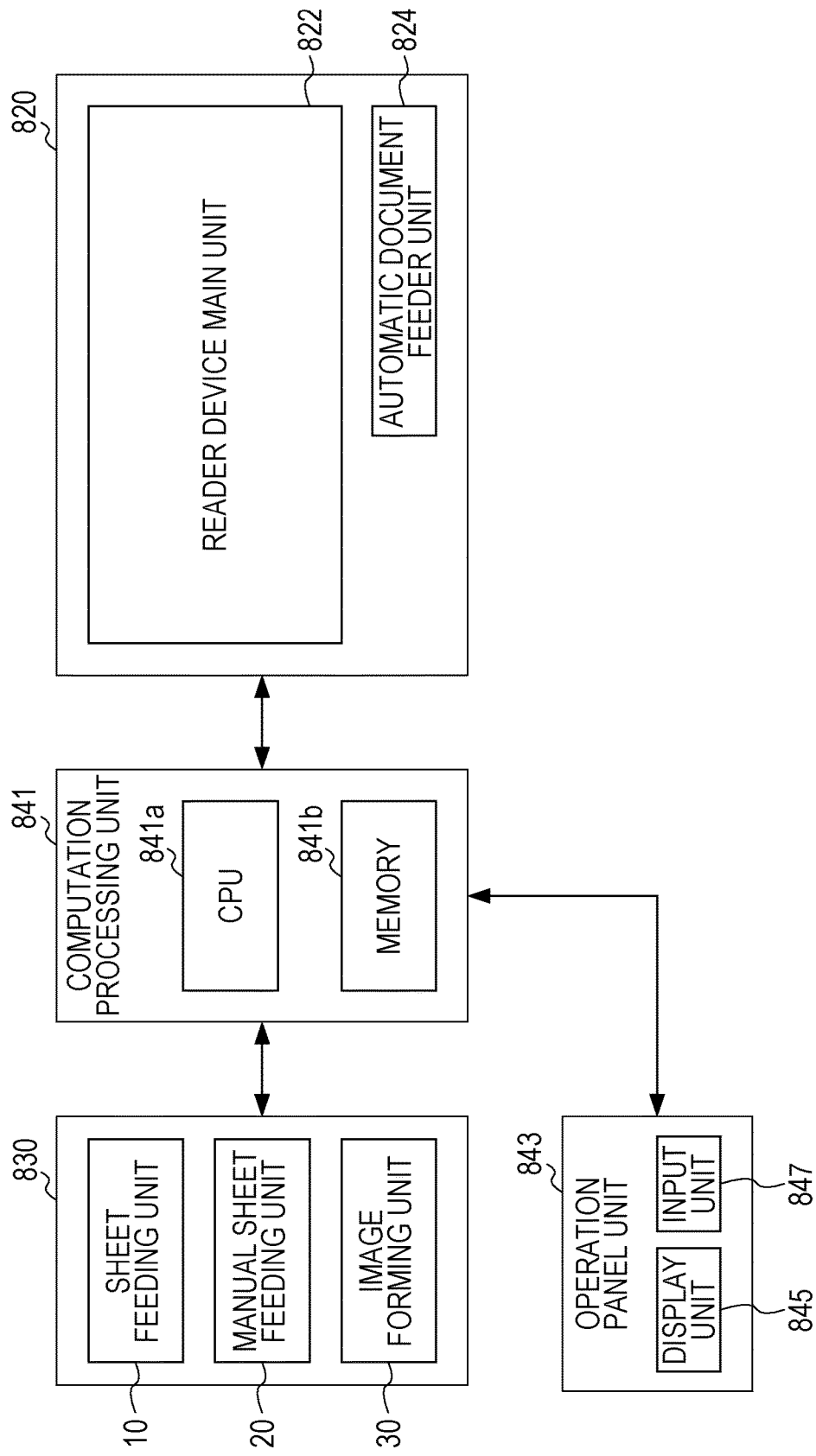

IMAGE FORMING DEVICE, MULTIFUNCTION PERIPHERAL, AND CONTROL METHOD OF IMAGE FORMING DEVICE

BACKGROUND

1. Field

The present disclosure relates to an image forming device, a multifunction peripheral, and a control method of the image forming device.

2. Description of the Related Art

Multifunction peripherals have one or more sheet feed trays (hereinafter may also be referred to simply as "tray"), with sheets selected by a user being loaded on the sheet feed trays.

If multifunction peripherals were used simply to perform normal printing on normal sheets, there might be no call for increased security regarding sheets. However, if high-grade sheets are left in a tray, for example, in a state where anybody can print, one night inadvertently print on high-grade sheets even though normal sheets would have sufficed. One might also remove the high-grade sheets from the tray. Further, one might load normal sheets on a tray designated for high-grade sheets. Moreover, one might inadvertently load high-grade sheets in a tray for normal sheets, instead of the intended tray designated for high-grade sheets.

Further, a situation can be assumed where different divisions in a corporation or the like all use normal sheets, but different trays are used by different divisions, according to operation rules. However, the rules may go unkept if the multifunction peripheral does not actually have functions corresponding to the rules. In a case where each division has a budget regarding sheets, and sheets of one division are used by another division, or sheets are removed from the tray for purposes other than printing, operations will not proceed according to budget. If a person from one division inadvertently supplies sheets to a tray for another division while intending to supply sheets to a tray for their own division, this amounts to a loss for the own division.

There have been multifunction peripherals with lockable sheet feed trays, to prevent expensive sheets (postage-prepaid postcards and so forth) set in the sheet feed trays from being stolen, but only a user having a key for the lock was able to open/close the sheet feed trays. This also has been insufficient from the perspective of security, since sheets could be fed from the sheet feed trays even when locked.

Further, even if opening/closing of particular sheet feed trays, and printing using the sheets in those sheet feed trays, is forbidden, if a display screen displays sheet sizes for expensive sheet in the sheet feed trays, a third party would be able to tell where the expensive sheets are located. This also has been insufficient from a security perspective.

Japanese Unexamined Patent Application Publication No. 2015-174756 discloses a multifunction peripheral where locked sheet feed trays can be unlocked even by those other than a manager when the remaining amount of sheets falls below a predetermined amount. However, this is problematic from a security perspective.

Japanese Unexamined Patent Application Publication No. 2015-182443 discloses a multifunction peripheral having a function of selectively locking/unlocking sheet feed trays. However, the user has to comprehend what sort of sheets are loaded on which trays in order to effectively use this function.

Accordingly, it is desirable to manage loading of sheets on trays, removing of sheets from trays, and what type of sheets loaded on which trays are to be used for printing, per user or division. It is also desirable to thereby increase security relating to sheets and proactively prevent economic loss.

It is desirable to provide an image forming device, a multifunction peripheral, and a control method of the image forming device, enabling control to improve security regarding sheets.

SUMMARY

According to an aspect of the disclosure, there is provided an image forming device including a print permitting/forbidding control unit configured to decide actual permitting/forbidding regarding printing regarding each of sheet feed trays, based on any one of, or a combination of any two or more of, settings of permitting/forbidding printing with regard to each sheet feed tray, settings of permitting/forbidding printing with regard to each sheet size, and settings of permitting/forbidding printing with regard to each sheet type. At least part of settings used by the print permitting/forbidding control unit to decide actual permitting/forbidding regarding printing, out of the settings of permitting/forbidding printing with regard to each sheet feed tray, settings of permitting/forbidding printing with regard to each sheet size, and settings of permitting/forbidding printing with regard to each sheet type, can be made to differ for each user.

According to an aspect of the disclosure, there is provided an image forming device including a sheet feed tray open/close permitting/forbidding control unit configured to decide actual permitting/forbidding regarding sheet feed tray open/close regarding each of sheet feed trays, based on any one of, or a combination of any two or more of, settings of permitting/forbidding tray opening/closing with regard to each sheet feed tray, settings of permitting/forbidding tray opening/closing with regard to each sheet size, and settings of permitting/forbidding tray opening/closing with regard to each sheet type. At least part of settings used by the sheet feed tray open/close permitting/forbidding control unit to decide actual permitting/forbidding regarding tray opening/closing, out of the settings of permitting/forbidding tray opening/closing with regard to each sheet feed tray, settings of permitting/forbidding tray opening/closing with regard to each sheet size, and settings of permitting/forbidding tray opening/closing with regard to each sheet type, can be made to differ for each user.

According to an aspect of the disclosure, there is provided a multifunction peripheral including the aforementioned image forming device.

According to an aspect of the disclosure, there is provided a non-transitory computer readable storage medium, storing a program causing a computer to function as the aforementioned image forming device.

According to an aspect of the disclosure, there is provided a control method of an image forming device. The method includes controlling of print permitting/forbidding, in which is decided actual permitting/forbidding regarding printing regarding each of sheet feed trays, based on any one of, or a combination of any two or more of, settings of permitting/forbidding printing with regard to each sheet feed tray, settings of permitting/forbidding printing with regard to each sheet size, and settings of permitting/forbidding printing with regard to each sheet type. At least part of settings used in the controlling of print permitting/forbidding to decide actual permitting/forbidding regarding printing, out of the settings of permitting/forbidding printing with regard to each sheet feed tray, settings of permitting/forbidding printing with regard to each sheet size, and settings of permitting/forbidding printing with regard to each sheet type, can be made to differ for each user.

According to an aspect of the disclosure, there is provided a control method of an image forming device. The method includes controlling of sheet feed tray open/close permitting/forbidding, in which is decided actual permitting/forbidding regarding sheet feed tray open/close regarding each of sheet feed trays, based on any one of, or a combination of any two or more of, settings of permitting/forbidding tray opening/closing with regard to each sheet feed tray, settings of permitting/forbidding tray opening/closing with regard to each sheet size, and settings of permitting/forbidding tray opening/closing with regard to each sheet type. At least part of settings used in the controlling of sheet feed tray open/close permitting/forbidding control unit to decide actual permitting/forbidding regarding tray opening/closing, out of the settings of permitting/forbidding tray opening/closing with regard to each sheet feed tray, settings of permitting/forbidding tray opening/closing with regard to each sheet size, and settings of permitting/forbidding tray opening/closing with regard to each sheet type, can be made to differ for each user.

BRIEF DESCRIPTION OF THE DRAWINGS

FIG. 1A is a diagram illustrating a screen for setting whether or not to impart each user with authority to open/close trays and authority to print, in a common embodiment according to the present disclosure;

FIG. 1B is a diagram illustrating a screen for setting whether or not to impart each user with authority to open/close trays and authority to print, per each tray, in a common embodiment according to the present disclosure;

FIG. 1C is a diagram illustrating a screen for setting whether or not to impart each user with authority to open/close trays and authority to print, per each sheet type, in a common embodiment according to the present disclosure;

FIG. 1D is a diagram illustrating a screen for setting whether or not to impart each user with authority to open/close trays and authority to print, per each sheet size, in a common embodiment according to the present disclosure;

FIG. 1F is a diagram illustrating a screen for setting whether or not to impart each user with authority to open/close trays and authority to print, per each original sheet type, in a common embodiment according to the present disclosure;

FIG. 2A is a table illustrating authority to open/close trays and authority to print, for a certain user, according to a first embodiment of the present disclosure;

FIG. 2B is a table illustrating types and sizes of sheets loaded on trays, according to the first embodiment of the present disclosure;

FIG. 2C is a table illustrating final tray open/close permission/forbidding for each tray, according to the first embodiment of the present disclosure;

FIG. 2D is a table illustrating final print permission/forbidding for each tray, according to the first embodiment of the present disclosure;

FIG. 2F is a table illustrating sheet size displayed on a screen for each tray, according to the first embodiment of the present disclosure;

FIG. 3A is a table illustrating authority to open/close trays and authority to print, for a certain user, according to a second embodiment of the present disclosure;

FIG. 3B is a table illustrating types and sizes of sheets loaded on trays, according to the second embodiment of the present disclosure;

FIG. 3C is a table illustrating final tray open/close permission/forbidding for each tray, according to the second embodiment of the present disclosure;

FIG. 3D is a table illustrating final print permission/forbidding for each tray, according to the second embodiment of the present disclosure;

FIG. 3E is a table illustrating sheet size displayed on a screen for each tray, according to the second embodiment of the present disclosure;

FIG. 4A is a table illustrating authority to open/close trays and authority to print, for a certain user, according to a third embodiment of the present disclosure;

FIG. 4B is a table illustrating types and sizes of sheets loaded on trays, according to the third embodiment of the present disclosure;

FIG. 4C is a table illustrating final tray open/close permission/forbidding for each tray, according to the third embodiment of the present disclosure;

FIG. 4D is a table illustrating final print permission/forbidding for each tray, according to the third embodiment of the present disclosure;

FIG. 4E is a table illustrating sheet size displayed on a screen for each tray, according to the third embodiment of the present disclosure;

FIG. 5A is a table illustrating authority to open/close trays and authority to print per each sheet size, for a certain user, according to a fourth embodiment of the present disclosure;

FIG. 5B is a table illustrating authority to open/close trays and authority to print per each sheet type, for a certain user, according to the fourth embodiment of the present disclosure;

FIG. 5C is a table illustrating types and sizes of sheets loaded on trays, according to the fourth embodiment of the present disclosure;

FIG. 5D is a table illustrating final tray open/close permission/forbidding for each tray, according to the fourth embodiment of the present disclosure;

FIG. 5E is a table illustrating final print permission/forbidding for each tray, according to the fourth embodiment of the present disclosure;

FIG. 5F is a table illustrating sheet size displayed on a screen for each tray, according to the fourth embodiment of the present disclosure;

FIG. 6A is a table illustrating authority to open/close trays and authority to print per each sheet size, for a certain user, according to a fifth embodiment of the present disclosure;

FIG. 6B is a table illustrating authority to open/close trays and authority to print per each sheet type, for a certain user, according to the fifth embodiment of the present disclosure;

FIG. 6C is a table illustrating types and sizes of sheets loaded on trays, according to the fifth embodiment of the present disclosure;

FIG. 6D is a table illustrating final tray open/close permission/forbidding for each tray, according to the fifth embodiment of the present disclosure;

FIG. 6E is a table illustrating final print permission/forbidding for each tray, according to the fifth embodiment of the present disclosure;

FIG. 6F is a table illustrating sheet size displayed on a screen for each tray, according to the fifth embodiment of the present disclosure;

FIG. 7A is a table illustrating authority to open/close trays and authority to print per each sheet size, for a certain user, according to a sixth embodiment of the present disclosure;

FIG. 7B is a table illustrating authority to open/close trays and authority to print per each sheet type, for a certain user, according to the sixth embodiment of the present disclosure;

FIG. 7C is a table illustrating authority to open/close trays and authority to print per each tray, for a certain user, according to the sixth embodiment of the present disclosure;

FIG. 7D is a table illustrating types and sizes or sheets loaded on trays, according to the sixth embodiment of the present disclosure;

FIG. 7E is a table illustrating final tray open/close permission/forbidding for each tray, according to the sixth embodiment of the present disclosure;

FIG. 7F is a table illustrating final print permission/forbidding for each tray, according to the sixth embodiment of the present disclosure;

FIG. 7G is a table illustrating sheet size displayed on a screen for each tray, according to the sixth embodiment of the present disclosure;

FIG. 8A is a table illustrating authority to open/close trays and authority to print per each sheet size, for a certain user, according to a seventh embodiment of the present disclosure;

FIG. 8B is a table illustrating authority to open/close trays and authority to print per each sheet type, for a certain user, according to the seventh embodiment of the present disclosure;

FIG. 8C is a table illustrating authority to open/close trays and authority to print per each tray, for a certain user, according to the seventh embodiment of the present disclosure;

FIG. 8D is a table illustrating types and sizes of sheets loaded on trays, according to the seventh embodiment of the present disclosure;

FIG. 8E is a table illustrating final tray open/close permission/forbidding for each tray, according to the seventh embodiment of the present disclosure;

FIG. 8F is a table illustrating final print permission/forbidding for each tray, according to the seventh embodiment of the present disclosure;

FIG. 8G is a table illustrating sheet size displayed on a screen for each tray, according to the seventh embodiment of the present disclosure;

FIG. 19 is a functional block diagram of a multifunction peripheral according to a common embodiment of the present disclosure.

DESCRIPTION OF THE EMBODIMENTS

Figure 9:
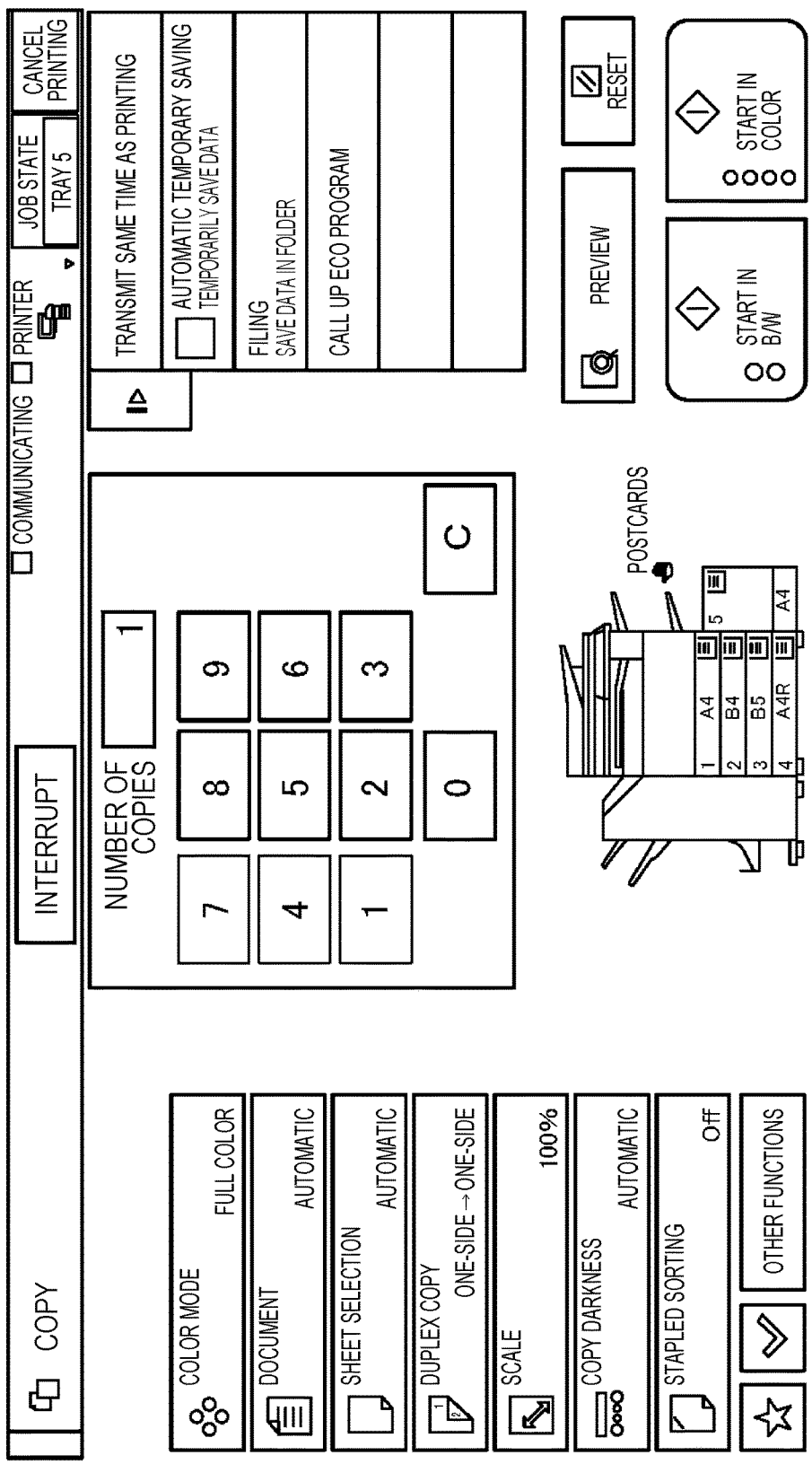
FIG. 9 is a diagram illustrating an example of sheet sizes being displayed on an operating screen for all trays, according to a common embodiment of the present disclosure.

Embodiments for carrying out the disclosure will be described in detail below with reference to the drawings.

Common Embodiment

In a first embodiment, a multifunction peripheral has a mechanism where opening and closing of trays can be electronically locked. The multifunction peripheral also has a function where sizes and types of sheets loaded on trays can be detected or input. The multifunction peripheral further has a function where a user is not able to use the multifunction peripheral without performing user authentication.

A manager or the like sets whether or not to impart each user with authority to open/close trays and authority to print, using a screen such as that illustrated in FIG. 1A. In the example illustrated in FIG. 1A, Taro Yamada is set to have authority to open/close trays and authority to print, while Hanako Yamada has neither authority to open/close trays nor authority to print. The authority set in FIG. 1A is stored in an authority table for each user. User IDs and each authority are stored in the authority table in a correlated manner.

The manager or the like also sets whether or not to impart authority to open/close trays and authority to print, for each user, using a screen such as that illustrated in FIG. 1B. In the example in FIG. 1B, the user that is the object of the settings is imparted with authority to open/close tray #1 and authority to print using sheets in tray #1, but is not authorized in this way regarding other trays. Note that arrangements are not restricted to such authority being directly applied, and there are cases where final authority may be decided according to combinations with other types of authority, which will be described later.

The manager or the like further sets whether or not to impart authority to open/close trays and authority to print per each sheet type, for each user, using a screen such as that illustrated in FIG. 1C. In the example in FIG. 1C, the user that is the object of the settings is imparted with authority to open/close trays corresponding to plain paper and authority to print using plain paper, and further is imparted with authority to open/close trays corresponding to glossy paper. Note that arrangements are not restricted to such authority being directly applied, and there are cases where final authority may be decided according to combinations with other types of authority, which will be described later.

The manager or the like further sets whether or not to impart authority to open/close trays and authority to print per each sheet size, for each user, using a screen such as that illustrated in FIG. 1D. In the example in FIG. 1D, the user that is the object of the settings is imparted with authority to open/close trays corresponding to A4 size sheets and authority to print using A4 size sheets, and further is imparted with authority to open/close trays corresponding to postcard size sheets. Note that arrangements are not restricted to such authority being directly applied, and there are cases where final authority is decided according to combinations with other types of authority, which will be described later.

The manager or the like moreover sets whether or not to impart authority to open/close trays and authority to print per original sheet type, for each user, using a screen such as that illustrated in FIG. 1E. In the example in FIG. 1E, the user that is the object of the settings is imparted with authority to open/close trays corresponding to an original sheet type named "custom sheet", but is not authorized to print using sheets of this type. Note that arrangements are not restricted to such authority being directly applied, and there are cases where final authority may be decided according to combinations with other types of authority, which will be described later.

First Embodiment

With reference to FIGS. 2A through 2E, when deciding final authority by tray-related authority alone, in a case where there are settings of authority regarding trays such as illustrated in FIG. 2A, and sheets distinguished by type and size are loaded on the trays as illustrated in FIG. 2B, tray open/close authority is decided as illustrated in FIG. 2C, and printing authority is decided as illustrated in FIG. 2D. A screen display for sheet sizes is also decided, as illustrated in FIG. 2E. The sheet size regarding which display has been decided is displayed overlaid on the tray portion of the multifunction peripheral in the operating screen. Note that a sheet size decided to be printable is displayed in a selectable manner in the sheet size selection screen, regardless of whether there is tray open/close authority or not.

The tray open/close authority directly set to the tray is set as the final tray open/close authority for the tray, as illustrated in FIG. 2C. Also, the print authority directly set to the tray is set as the final print authority for the tray, as illustrated in FIG. 2D. Further, the size of sheets loaded on a tray that can be opened/closed and can be printed from is displayed overlaid on that tray, as illustrated in FIG. 2E. Moreover, the size of sheets loaded on a tray that can be printed from is selectable, regardless of whether that tray can be opened/closed.

For example, sheets that are heavy paper regarding type and A4 regarding size are loaded on the tray #1, and tray open/close authority is imparted regarding the tray #1 and print authority also is imparted in the table in FIG. 2A, so tray open/close is permitted as illustrated in FIG. 2C for the tray #1, and printing is permitted as illustrated in FIG. 2D. A screen display of sheet size A4 loaded on this tray is overlaid on the tray #1 portion, as illustrated in FIG. 2E. Further, the sheet size A4 is selectable in the sheet selection screen.

Also for example, sheets that are heavy paper regarding type and B5 regarding size are loaded on the tray #3, and tray open/close authority is not imparted regarding the tray #3 and neither is print authority imparted in the table in FIG. 2A, so tray open/close is forbidden as illustrated in FIG. 2C for the tray #3, and printing is forbidden as illustrated in FIG. 2D. A screen display of sheet size B5 loaded on this tray is not overlaid on the tray #3 portion, as illustrated in FIG. 2E. Further, the sheet size B5 is not selectable in the sheet selection screen, if not selectable with regard to another tray.

Second Embodiment

With reference to FIGS. 3A through 3E, when deciding final authority by authority related to sheet type alone, in a case where there are settings of authority such as illustrated in FIG. 3A, and sheets distinguished by type and size are loaded on the trays as illustrated in FIG. 3B, tray open/close authority is decided as illustrated in FIG. 3C, and printing authority is decided as illustrated in FIG. 3D. A screen display for sheet sizes is also decided, as illustrated in FIG. 3E. Note that a sheet size decided to be displayed is displayed overlaid on a tray portion of the multifunction peripheral in the operating screen. Also, a sheet size decided to be printable is displayed in a selectable manner in the sheet size selection screen, regardless of whether there is tray open/close authority or not.

The tray open/close authority directly set to the type of sheets loaded on the tray is set as the final tray open/close authority for the tray, as illustrated in FIG. 3O. Also, the print authority directly set to the type of sheets loaded on the tray is set as the final print authority for the tray, as illustrated in FIG. 3D. Further, the size of sheets loaded on a tray set to be able to be opened/closed and to be able to be printed from is displayed overlaid on that tray, as illustrated in FIG. 3E. Moreover, the size of sheets loaded on a tray that can be printed from is selectable, regardless of whether that tray can be opened/closed.

For example, sheets that are heavy paper regarding type and A4 regarding size are loaded on the tray #1, and tray open/close authority is imparted regarding sheets that are heavy paper in type loaded on the tray #1 and print authority also is imparted thereto in the table in FIG. 3A, so tray open/close is permitted as illustrated in FIG. 3C for the tray #1, and printing is permitted as illustrated in FIG. 3D. A screen display of sheet size A4 loaded on this tray is overlaid on the tray #1 portion, as illustrated in FIG. 3E. Further, the sheet size A4 is selectable in the sheet selection screen.

Also for example, sheets that are glossy paper regarding type and A4 regarding size are loaded on the tray #5, and tray open/close authority is not imparted regarding the tray #5 but print authority is imparted in the table in FIG. 3A, so tray open/close is forbidden as illustrated in FIG. 3C but printing is permitted as illustrated in FIG. 3D. A screen display of sheet size A4 loaded on this tray is overlaid on the tray #1 portion, as illustrated in FIG. 3E. Further, the sheet size A4 is selectable in the sheet selection screen.

Third Embodiment

With reference to FIGS. 4A through 4E, when deciding final authority by authority related to sheet size alone, in a case where there are settings of authority such as illustrated in FIG. 4A, and sheets distinguished by type and size are loaded on the trays as illustrated in FIG. 4B, tray open/close authority is decided as illustrated in FIG. 4C, and printing authority is decided as illustrated in FIG. 4D. A screen display for sheet sizes is also decided, as illustrated in FIG. 4E. Note that a sheet size decided to be displayed is displayed overlaid on a tray portion of the multifunction peripheral in the operating screen. Also, a sheet size decided to be printable is displayed in a selectable manner in the sheet size selection screen, regardless of whether there is tray open/close authority or not.

The tray open/close authority directly set to the size of sheets loaded on the tray is set as the final tray open/close authority for the tray, as illustrated in FIG. 4C. Also, the print authority directly set to the size of sheets loaded on the tray is set as the final print authority for the tray, as illustrated in FIG. 4D. Further, the size of sheets loaded on a tray that is set to be able to be opened/closed and can be printed from is displayed overlaid on that tray, as illustrated in FIG. 4E. Moreover, the size of sheets loaded on a tray that can be printed from is selectable, regardless of whether that tray can be opened/closed.

For example, sheets that are heavy paper regarding type and A4 regarding size are loaded on the tray #1, and tray open/close authority is imparted regarding sheets of which the sheet size is A4 loaded on the tray #1 and print authority also is imparted thereto in the table in FIG. 4A, so tray open/close is permitted as illustrated in FIG. 4C for the tray #1, and printing is permitted as illustrated in FIG. 4D. A screen display of sheet size A4 loaded on this tray is overlaid on the tray #1 portion, as illustrated in FIG. 4E. Further, the sheet size A4 is selectable in the sheet selection screen.

Also for example, sheets that are plain paper regarding type and A4R regarding size are loaded on the tray #4, and tray open/close authority is not imparted regarding A4R that is the sheet size of the sheets loaded on the tray #4 and neither is print authority imparted in the table in FIG. 4A, so tray open/close is forbidden as illustrated in FIG. 4C and printing is forbidden as illustrated in FIG. 4D. A screen display of sheet size A4R loaded on this tray is not overlaid on the tray #4 portion, as illustrated in FIG. 4E. Further, the sheet size A4R is not selectable in the sheet selection screen, if not selectable with regard to another tray.

Fourth Embodiment

With reference to FIGS. 5A through 5F, when deciding final authority by a combination of sheet type related authority and sheet size related authority (i.e., in a case where authority is imparted only in a case where both authorities have been imparted, although this is not restrictive), in a case where there are settings of authority regarding sheet size and sheet type such as illustrated in FIGS. 5A and 5B, and sheets distinguished by type and size are loaded on the trays as illustrated in FIG. 5C, an arrangement may be made where tray open/close authority is decided as illustrated in FIG. 5D, and printing authority is decided as illustrated in FIG. 5E. A screen display for sheet sizes is also decided, as illustrated in FIG. 5F. Also, sheet sizes displayed overlaid on a tray in FIG. 5F are displayed as selectable sheet sizes in the sheet size selection screen.

Settings may be made such that final authority regarding tray opening/closing of a tray is imparted in a case where both of the tray open/close authority set to the type of sheets loaded on the tray and the tray open/close authority set to the size of sheets loaded on the tray are imparted, as illustrated in FIG. 5D. Note that this is not restrictive, however, and that an arrangement may be made where final tray open/close authority is imparted in a case where one or the other is imparted. Also, settings may be made such that final authority for printing regarding a tray is imparted in a case where both of the print authority set to the type of sheets loaded on the tray and the print authority set to the size of sheets loaded on the tray are imparted, as illustrated in FIG. 5E. Note that this is not restrictive, however, and that an arrangement may be made where final printing authority is imparted in a case where one or the other is imparted. Further, the size of sheets loaded on a tray that can be opened/closed and can be printed from is displayed overlaid on that tray, as illustrated in FIG. 5F. Moreover, the size of sheets loaded on a tray that can be printed from is selectable, regardless of whether that tray can be opened/closed.

For example, sheets that are heavy paper regarding type and A4 regarding size are loaded on the tray #1, and tray open/close authority is imparted regarding sheets that are heavy paper in type loaded on the tray #1 and print authority also is imparted thereto in the table in FIG. 5A, so tray open/close authority is imparted with regard to heavy paper than the is the sheet type of sheets loaded on the tray #1, and printing authority also is imparted thereto. Accordingly, tray open/close is permitted as illustrated in FIG. 5D for the tray #1, and printing is permitted as illustrated in FIG. F. A screen display of sheet size A4 loaded on this tray is overlaid on the tray #1 portion, as illustrated in FIG. 5F. Further, the sheet size A4 is selectable in the sheet selection screen.

Also for example, sheets that are plain paper regarding type and A4R regarding size are loaded on the tray #4, and neither tray open/close authority nor print authority is imparted regarding A4R that is the sheet size loaded on the tray #4 in the table in FIG. 5A, while tray open/close authority and print authority are imparted to plain paper of the sheet type loaded on tray #2, so tray open/close of the tray #4 is forbidden as illustrated in FIG. 5D and printing is also forbidden as illustrated in FIG. 5E. A screen display of sheet size A4R loaded on tray #4 is not made, as illustrated in FIG. 5F. Further, the sheet size A4R is selectable in the sheet selection screen.

Fifth Embodiment

FIGS. 6A through 6F illustrate a case where, with regard to trays on which sheets of an original sheet type are loaded, final decision of authority is made by authority related to the original sheet type alone. In a case where there are settings of authority regarding sheet size and sheet type such as illustrated in FIGS. 6A and 6B (and particularly there are settings of authority such as illustrated in FIG. 6B regarding the original sheet type), and sheets distinguished by type and size are loaded on the trays as illustrated in FIG. 6C, an arrangement may be made where tray open/close authority is decided as illustrated in FIG. 6D, and printing authority is decided as illustrated in FIG. 6E. A screen display for sheet sizes is also decided, as illustrated in FIG. 6F. Also, a sheet size decided to be displayed is displayed overlaid on a tray portion of the multifunction peripheral in the operating screen. Also, a sheet size decided to be printable is displayed in a selectable manner in the sheet size selection screen, regardless of whether there is tray open/close authority or not.

Settings are made such that final authority regarding tray opening/closing of a tray is imparted in a case where both of the tray open/close authority directly set to the type of sheets loaded on the tray and the tray open/close authority set to the size of sheets loaded on the tray are imparted, as illustrated in FIG. 6D. Note that this is not restrictive, however, and that an arrangement may be made where final tray open/close authority is imparted in a case where one or the other is imparted. Also, settings are made such that final authority for printing regarding a tray is imparted in a case where both of the print authority directly set to the type of sheets loaded on the tray and the print authority set to the size of sheets loaded on the tray are imparted, as illustrated in FIG. 6E. Note that this is not restrictive, however, and that an arrangement may be made where final printing authority is imparted in a case where one or the other is imparted. Further, the size of sheets loaded on a tray that can be opened/closed and can be printed from is displayed overlaid on that tray, as illustrated in FIG. 6F. Moreover, the size of sheets loaded on a tray that can be printed from is selectable, regardless of whether that tray can be opened/closed.

Further, in a case where the type of a sheet loaded on a tray is an original sheet type, tray open/close authority directly set regarding the type of the sheet loaded on the tray may be the final tray open/close authority for the tray, as illustrated in FIG. 6D. Moreover, in a case where the type of a sheet loaded on a tray is an original sheet type, print authority directly set regarding the type of the sheet loaded on the tray may be the final print authority for the tray, as illustrated in FIG. 6E.

For example, sheets that are original #1 regarding sheet type are loaded on the tray #2, and tray open/close authority is imparted regarding sheets that are original #1 loaded on the tray #2 and print authority also is imparted thereto in the table in FIG. 6B, so tray open/close is permitted as illustrated in FIG. 6D for the tray #1, and printing is permitted as illustrated in FIG. 6E. A screen display of original #1 loaded on this tray is overlaid on the tray #2 portion, as illustrated in FIG. 6F. Further, the sheet type original #1 is selectable in the sheet type selection screen.

Also for example, sheets that are original #2 regarding sheet type are loaded on the tray #3, and neither tray open/close authority nor print authority is imparted regarding the original #2 loaded on the tray #3 in the table in FIG. 6B, so tray open/close is forbidden as illustrated in FIG. 6D and printing is also forbidden as illustrated in FIG. 6E. An overlaid screen display of original #2 loaded here is not made, as illustrated in FIG. 6F. Further, the sheet type original #2 is not selectable in the sheet selection screen, if not selectable with regard to another tray.

Sixth Embodiment

With reference to FIGS. 7A through 7G, when deciding final authority by a combination of the three of authority assigned to trays, authority related to sheet type, and authority related to sheet size (i.e., in a case where authority is imparted only in a case where all three authorities have been imparted, although this is not restrictive), in a case where there are settings of authority such as illustrated in FIGS. 7A through 7C, and sheets distinguished by type and size are loaded on the trays as illustrated in FIG. 7D, an arrangement may be made where tray open/close authority is decided as illustrated in FIG. 7E, and printing authority is decided as illustrated in FIG. 7F. A screen display for sheet sizes is also decided, as illustrated in FIG. 7G. Also, sheet sizes displayed overlaid on a tray in FIG. 7G are displayed as selectable sheet sizes in the sheet size selection screen.

Settings may be made such that final authority regarding tray opening/closing of a tray is imparted in a case where all of the tray open/close authority directly set to the tray, the tray open/close authority set to the type of sheets loaded on the tray, and the tray open/close authority set to the size of sheets loaded on the tray are imparted, as illustrated in FIG. 7E. Note that this is not restrictive, however, and that an arrangement may be made where final tray open/close authority is imparted in a case where one or two thereof is imparted. Also, settings may be made such that final authority for printing regarding a tray is imparted in a case where all of the printing authority directly set to the tray, the printing authority directly set to the type of sheets loaded on the tray, and the printing authority set to the size of sheets loaded on the tray are imparted, as illustrated in FIG. 7F. Note that this is not restrictive, however, and that an arrangement may be made where final printing authority is imparted in a case where one or two thereof is imparted. Further, the size of sheets loaded on a tray that can be opened/closed and can be printed from is displayed overlaid on that tray, as illustrated in FIG. 7G. Moreover, the size of sheets loaded on a tray that can be printed from is selectable, regardless of whether that tray can be opened/closed.

For example, sheets that are heavy paper regarding type and A4 regarding size are loaded on the tray #1, tray open/close authority is imparted regarding A3 size sheets and print authority also is imparted thereto in the table in FIG. 7A, tray open/close authority is imparted regarding plain paper and print authority also is imparted thereto in the table in FIG. 7B, and tray open/close authority is imparted regarding tray #1 and print authority also is imparted thereto in the table in FIG. 7C, so tray open/close is permitted as illustrated in FIG. 7E for the tray #1, and printing is permitted as illustrated in FIG. 7F. A screen display of sheet size A4 loaded on this tray is overlaid on the tray #1 portion, as illustrated in FIG. 7G. Further, the sheet size A3 is selectable in the sheet selection screen.

Also for example, sheets that are heavy paper regarding type and B5 regarding size are loaded on the tray #3, tray open/close authority is imparted regarding B5 size sheets and print authority also is imparted thereto in the table in FIG. 7A, tray open/close authority is imparted regarding heavy paper and print authority also is imparted thereto in the table in FIG. 7B, and neither tray open/close authority nor print authority is imparted regarding tray #3 in the table in FIG. 7C, so tray open/close of the tray #3 is forbidden as illustrated in FIG. 7E and printing is also forbidden as illustrated in FIG. 7F. A screen display of sheet size B5 loaded here is not overlaid on the portion of tray #1, as illustrated in FIG. 7G. Further, the sheet size B5 is not selectable in the sheet selection screen, if not selectable with regard to another tray.

Seventh Embodiment

FIGS. 8A through 8G illustrate a case where there is a tray where sheets of an original sheet type are loaded, in a case of deciding final authority by a combination of the three of authority assigned to trays, authority related to sheet type, and authority related to sheet size (i.e., in a case where authority is imparted only in a case where all three authorities have been imparted, although this is not restrictive).

In a case where there are settings of authority regarding sheet size and sheet type such as illustrated in FIGS. 8A through 8C (and particularly there are settings of authority such as illustrated in FIG. 8B regarding the original sheet type), and sheets distinguished by type and size are loaded on the trays as illustrated in FIG. 8D, an arrangement may be made where tray open/close authority is decided as illustrated in FIG. 8E, and printing authority is decided as illustrated in FIG. 8F. A screen display for sheet sizes is also decided, as illustrated in FIG. 8G. Also, sheet sizes displayed overlaid on a tray in FIG. 8G are displayed as selectable sheet sizes in the sheet size selection screen.

Settings may be made such that final authority regarding tray opening/closing of a tray is imparted in a case where all of the tray open/close authority directly set to the tray, the tray open/close authority directly set to the type of sheets loaded on the tray, and the tray open/close authority set to the size of sheets loaded on the tray are imparted, as illustrated in FIG. 8E. Note that this is not restrictive, however, and that an arrangement may be made where final tray open/close authority is imparted in a case where one or two thereof is imparted. Also, settings may be made such that final authority for printing regarding a tray is imparted in a case where all of the printing authority directly set to the tray, the printing authority directly set to the type of sheets loaded on the tray, and the printing authority set to the size of sheets loaded on the tray are imparted, as illustrated in FIG. 8F. Note that this is not restrictive, however, and that an arrangement may be made where final printing authority is imparted in a case where one or two thereof is imparted. Further, the size of sheets loaded on a tray that can be opened/closed and can be printed from is d splayed overlaid on that tray, as illustrated in FIG. 8G. Moreover, the size of sheets loaded on a tray that can be printed from is selectable, regardless of whether that tray can be opened/closed.

Further, in a case where the type of a sheet loaded on a tray is an original sheet type, the final tray open/close authority regarding the tray may be decided based on both of the tray open/close authority directly set to the tray and the tray open/close authority directly set regarding the type of the sheet loaded on the tray, as illustrated in FIG. 8D. Moreover, in a case where the type of a sheet loaded on a tray is an original sheet type, the final print authority regarding the tray may be decided based on both of the printing authority directly set to the tray and the printing authority directly set regarding the type of the sheet loaded on the tray, as illustrated in FIG. 8E.

For example, sheets that are original #1 regarding sheet type are loaded on the tray #2, and tray open/close authority is imparted regarding sheets that are original #1 loaded on the tray #2 and print authority also is imparted thereto in the table in FIG. 8B, and tray open/close authority and print authority are imparted to the tray #2 in the table in FIG. 8C, so tray open/close is permitted as illustrated in FIG. 8E for the tray #2, and printing as permitted as illustrated in FIG. 8F. A screen display of original #1 loaded on this tray is overlaid on the tray #2 portion, as illustrated in FIG. 8G.

Also for example, sheets that are original #2 regarding sheet type are loaded on the tray #3, and neither tray open/close authority nor print authority is imparted regarding the original #2 loaded on the tray #3 in the table in FIG. 8B, and also neither tray open/close authority nor print authority is imparted regarding the tray #3 in the table in FIG. 8C, so tray open/close is forbidden as illustrated in FIG. 8F and printing is also forbidden as illustrated in FIG. 8G. A screen display of the sheet type original #2 loaded on this tray is not overlaid on the tray #3 portion, as illustrated in FIG. 8G.

Eighth Embodiment

The final authority may be decided by a combination of the two of authority assigned to trays and authority assigned to sheet types, or the final authority may be decided by a combination of the two of authority assigned to trays and authority assigned to sheet sizes.

Ninth Embodiment

In the above-described embodiments, authority regarding permitting/forbidding of printing, to be directly assigned to trays, is set for each user. Similarly, authority regarding permitting/forbidding of printing, to be assigned to sheet sizes, is set for each user. Also similarly, authority regarding permitting/forbidding of printing, to be assigned to sheet types, is set for each user.

In the present embodiment at least one type of authority to of the above three types of authority is held in common among users. For example, permitting/forbidding of printing, to be directly assigned to each tray, is held in common among users. Even if part of the authority is held in common among users, the final authority of each user regarding trays can be differentiated overall by setting other authorities to be combined therewith (e.g., authority regarding permitting/forbidding of printing to be set for each sheet type for the users) for each user, and security can be secured.

The aforementioned equally applies to authority relating to permitting/forbidding of tray open/close to be directly assigned to trays, authority relating to permitting/forbidding of sheet feed tray open/close to be assigned to sheet sizes, and authority relating to permitting/forbidding of sheet feed tray open/close to be assigned to sheet types.

Common Embodiment

Figure 10:
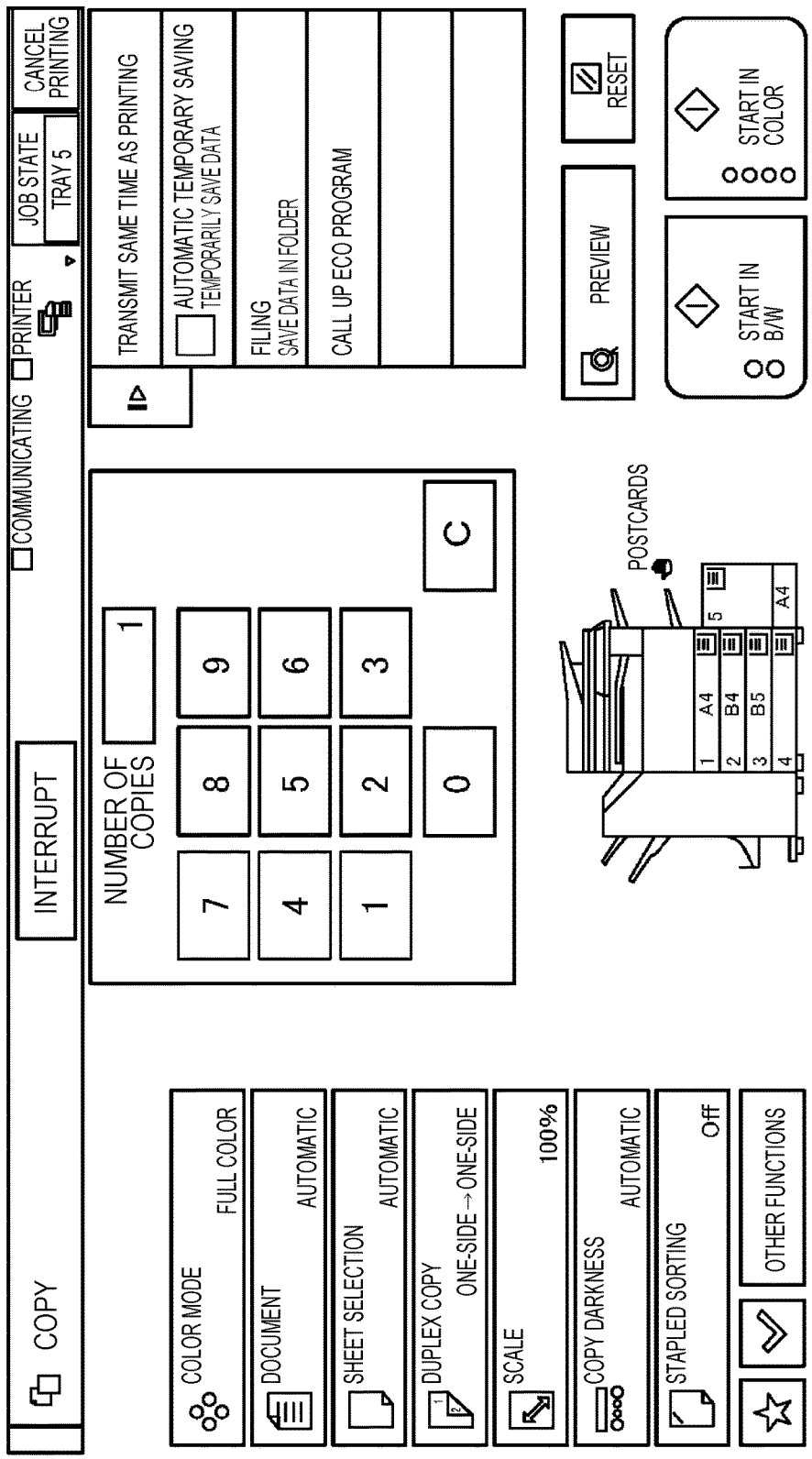
FIG. 10 is a diagram illustrating an example of sheet sizes being displayed on an operating screen for all trays excluding one tray, according to a common embodiment of the present disclosure.

Next, an image of a multifunction peripheral is displayed on the settings screen as illustrated in FIG. 9. Sizes of sheets loaded on trays of the multifunction peripheral can be displayed overlaid on the respective trays. In reality, sheet sizes are d splayed overlaid only on trays where tray open/close authority and print authority have been imparted, as illustrated in FIG. 10. In the example in FIG. 10, at least one of tray open/close authority and print authority has not been imparted to the tray #4, so sheet size is not displayed overlaid. Both tray open/close authority and print authority have been imparted to trays #1 through #3 and #5, so sheet sizes are displayed overlaid.

Description has been made above regarding an example where a screen display is made in which sheet sizes are displayed overlaid on trays where the sheets are loaded only in a case where tray authority has been imparted regarding opening/closing of the tray, and authority to print has also been imparted. However, in another example, an arrangement may be made where in which sheet sizes are displayed overlaid on trays where the sheets are loaded if print authority has been imparted, even if tray open/close authority for that tray has not been imparted.

Figure 11A:
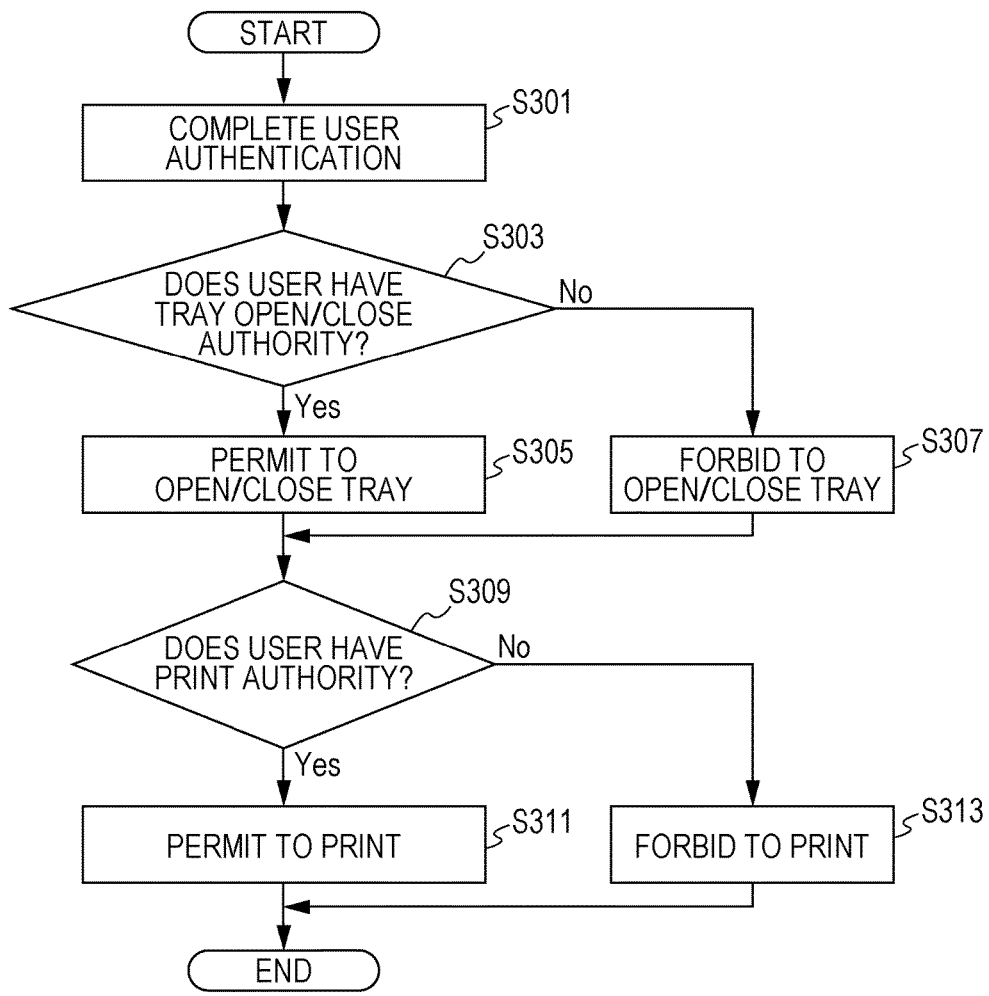
FIG. 11A is a flowchart for describing operations of a multifunction peripheral when a user logs in, according to a common embodiment of the present disclosure.

Next, operations will be described. With reference to FIG. 11A, upon user authentication having been completed (step S301), an authority table is searched based on the user ID, and if the user is a user that has tray open/close authority (Yes in step S303), a tray open/close flag for permitting tray open/close is set (step S305), while if the user is a user that does not have tray open/close authority (No in step S303), the tray open/close flag is reset to (orbit tray open/close (step S307). Next, if the user is a user that has print authority (Yes in step S309), a print flag is set to permit printing (step S311), while if the user is not a user that has print authority (No in step S309), the print flag is reset to forbid printing (step S313).

Figure 11B:
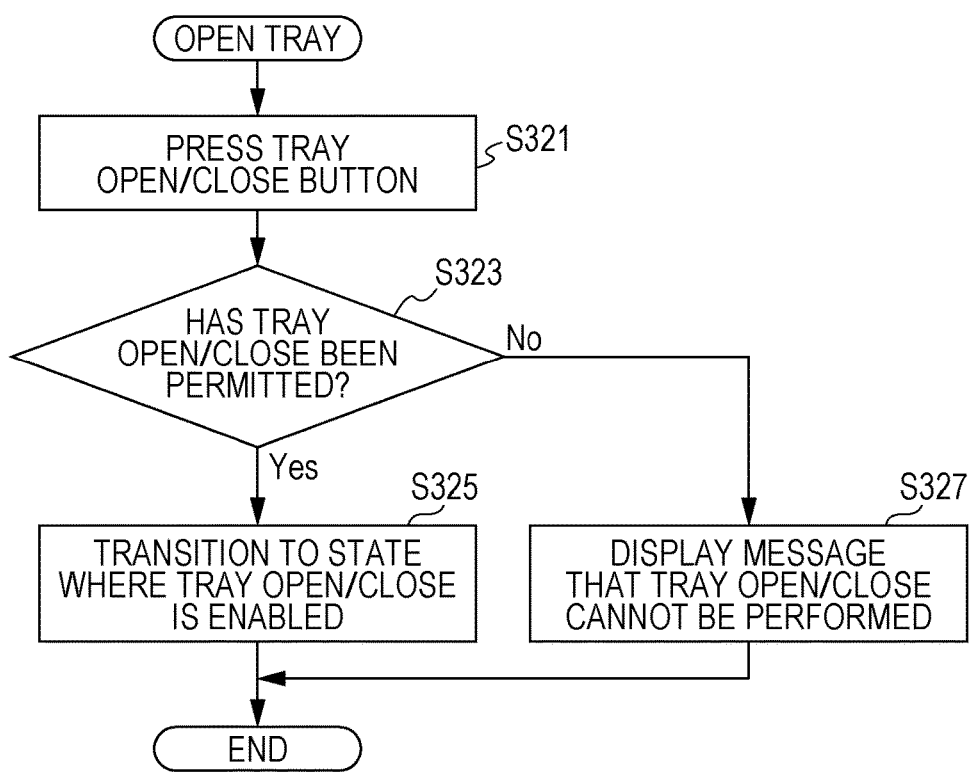
FIG. 11B is a flowchart for describing operations of a multifunction peripheral when a tray open/close button is pressed, according to a common embodiment of the present disclosure.

With reference to FIG. 11B, when a tray open/close button is pressed (step S321), if the tray open/close flag has been set and indicates that tray open/close is permitted (Yes in step S323), the state transitions to a state where tray open/close can be performed (step S325), while if the tray open/close flag has been reset and indicates that tray open/close is forbidden. (No in step S323), a message is displayed that tray open/close is not able to be performed (step S327).

Figure 11C:
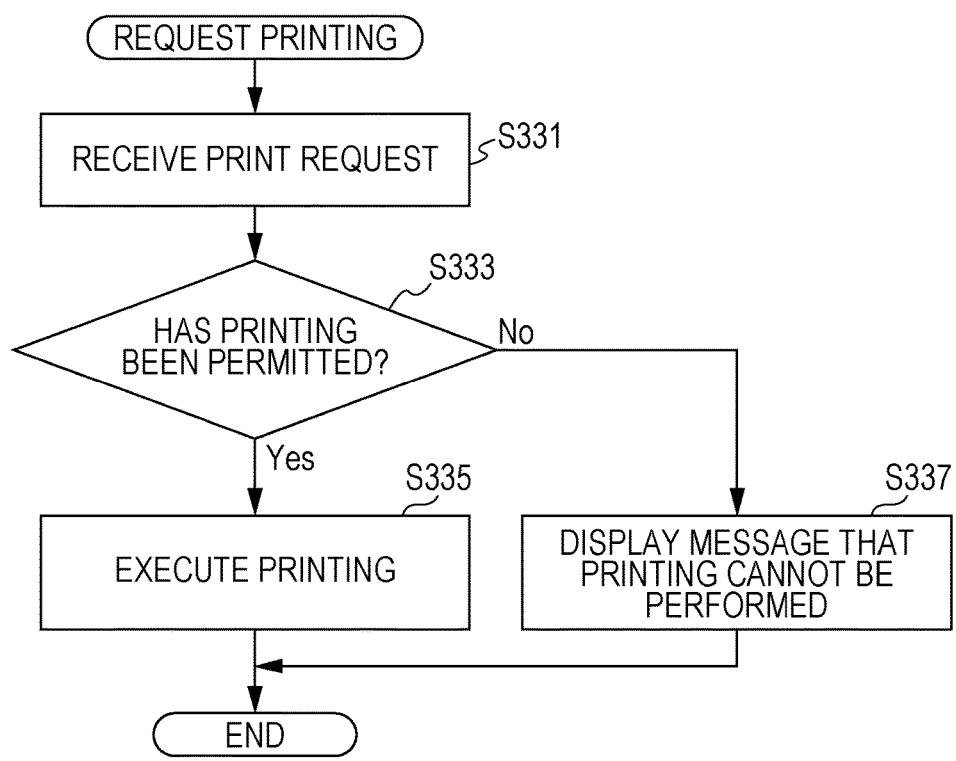
FIG. 11C is a flowchart for describing operations of a multifunction peripheral when a print request is received, according to a common embodiment of the present disclosure.

With reference to FIG. 11C, when receiving a print request (step S331), if the print flag has been set and indicates that printing is permitted (Yes in step S333), printing is executed (step S335). If the print flag has been reset and indicates that printing is forbidden (No in step S333), a message is displayed that printing is not able to be performed (step S337).

Operations of First Embodiment

Figure 12A:
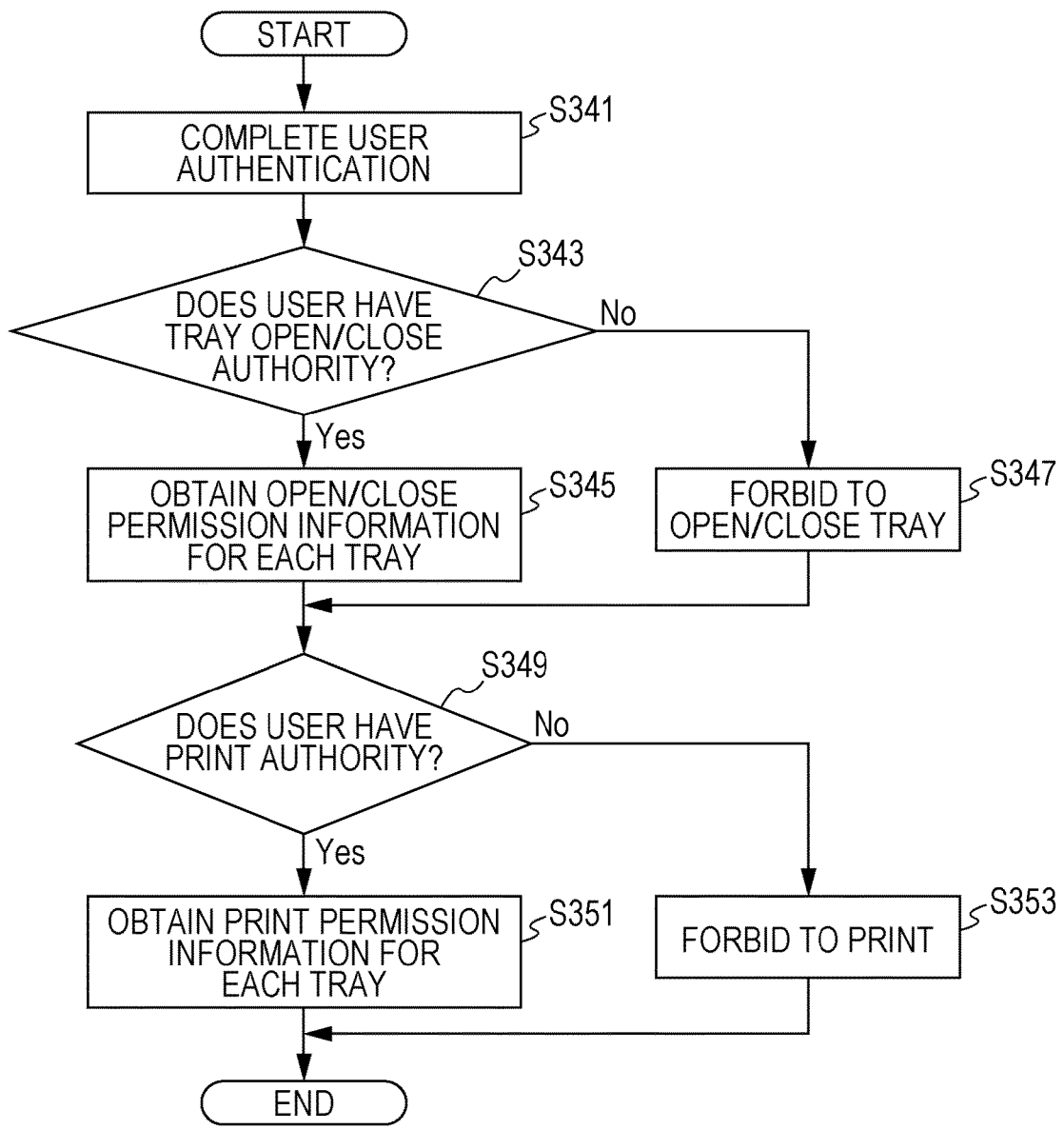
FIG. 12A is a flowchart for describing operations of a multifunction peripheral when a user logs in, according to the first embodiment of the present disclosure.

Next, operations in a case where users have tray open/close authority and print authority for individual trays will be described. With reference to FIG. 12A, upon user authentication having been completed (step S341), the authority table is searched based on the user ID, and if the user is a user that has tray open/close authority (Yes in step S343), a tray open/close flag for permitting tray open/close is set, and thereafter open/close permission information for each tray is obtained (step S345), while if the user is a user that does not have tray open/close authority (No in step S343), the tray open/close flag is reset to forbit tray open/close (step S347). Next, if the user is a user that has print authority (Yes in step S349), print permission information is obtained to permit printing for each tray (step S351), while if the user is not a user that has print authority (No in step S349), the print flag is reset to forbid printing (step S353).

Figure 12B:
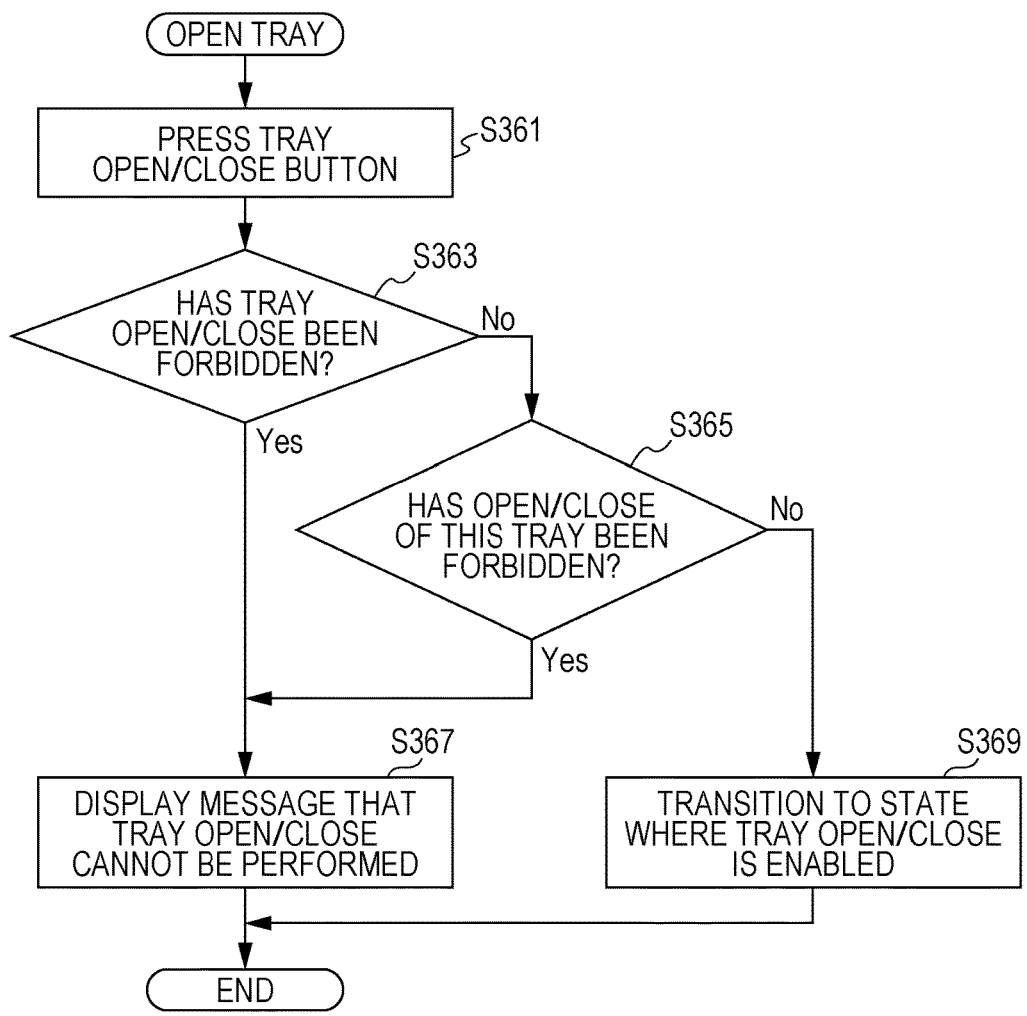
FIG. 12B is a flowchart for describing operations of a multifunction peripheral when a tray open/close button provided to each tray is pressed, according to the first embodiment of the present disclosure.

With reference to FIG. 12B, when a tray open/close button provided for each tray is pressed (step S361), if the tray open/close flag has been reset and indicates that tray open/close is forbidden (Yes in step S363), a message is displayed that tray open/close is not able to be performed (step S367). If the tray open/close flag has been set and indicates that tray open/close is permitted (No in step S363), and judgement is made that opening/closing of this tray has been forbidden based on the open/close permission information corresponding to this tray (Yes in step S365), a message is displayed that tray open/close is not able to be performed (step S367). If judgement is made that opening/closing of this tray has been permitted based on the open/close permission information corresponding to this tray (No in step S365), the state transitions to a state where tray open/close can be performed (step S369).

Figure 12C:
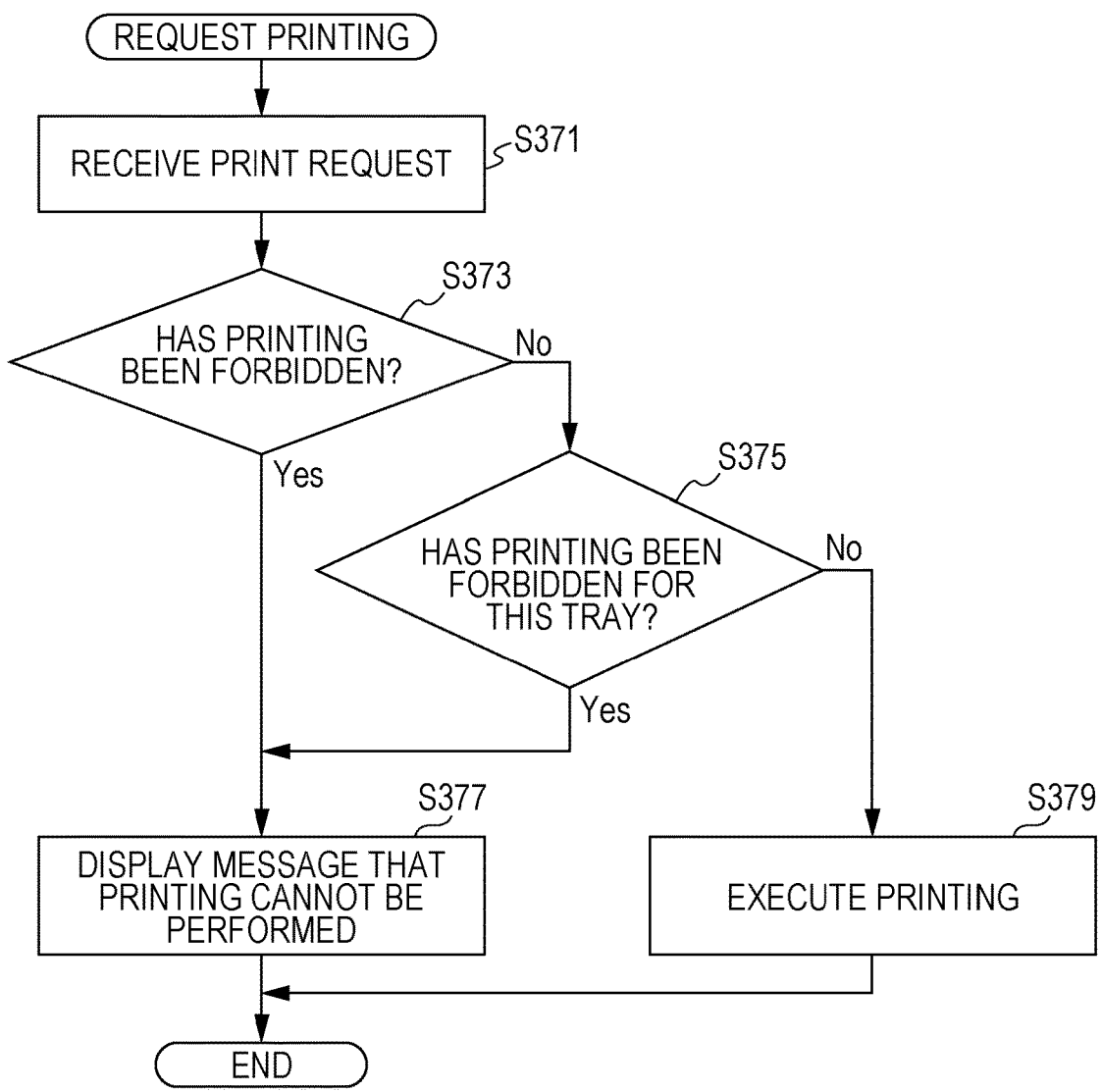
FIG. 12C is a flowchart for describing operations of a multifunction peripheral when a print request is received, according to the first embodiment of the present disclosure.

With reference to FIG. 12C, when receiving a print request (step S371), if the print flag has been reset and indicates that printing is forbidden (Yes in step S373), a message is displayed that printing is not able to be performed (step S377). If the print flag has been set and indicates that printing is permitted (No in step S373), and judgement is made that printing using sheets of this tray has been forbidden based on the print permission information corresponding to this tray (Yes in step S375), a message is displayed that printing is not able to be performed (step S377). If judgement is made that printing using sheets of this tray has been permitted based on the print permission information corresponding to this tray (No in step S375), printing using sheets of this tray is executed (step S379).

Operations of Second Embodiment

Figure 13A:
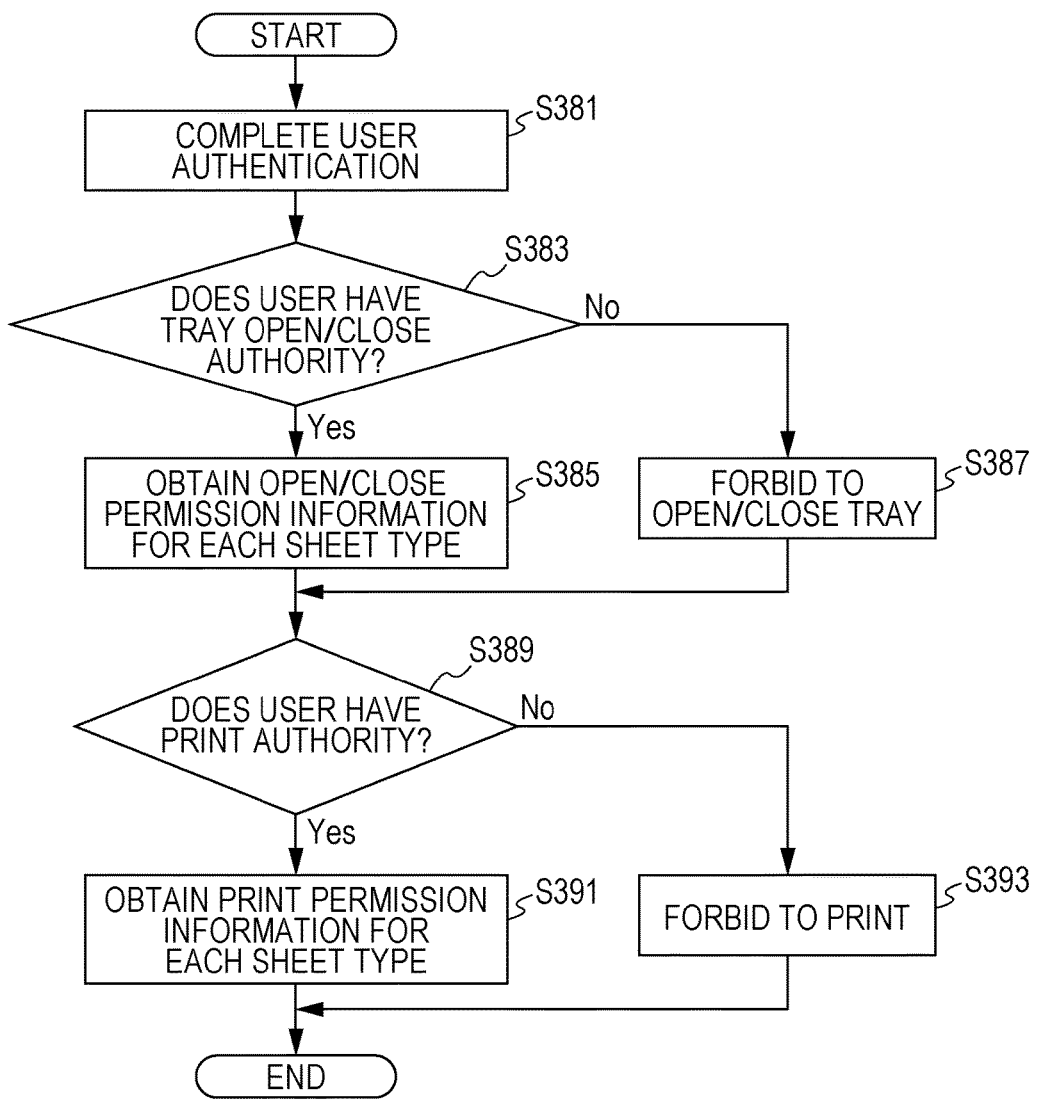
FIG. 13A is a flowchart for describing operations of a multifunction peripheral when a user logs in, according to the second embodiment of the present disclosure.

Next, operations in a case where users have tray open/close authority and print authority for individual sheet types will be described. With reference to FIG. 13A, upon user authentication having been completed (step S381), the authority table is searched based on the user ID, and if the user is a user that has tray open/close authority (Yes in step S383), a tray open/close flag for permitting tray open/close is set, and thereafter open/close permission information for each sheet type is obtained (step S385), while if the user is a user that does not have tray open/close authority (No in step S383), the tray open/close flag is reset to forbit tray open/close (step S387). Next, if the user is a user that has print authority (Yes in step S389), print permission information is obtained to permit printing for each sheet type (step S391), while if the user is not a user that has print authority (No in step S389), the print flag is reset to forbid printing (step S393).

Figure 13B:
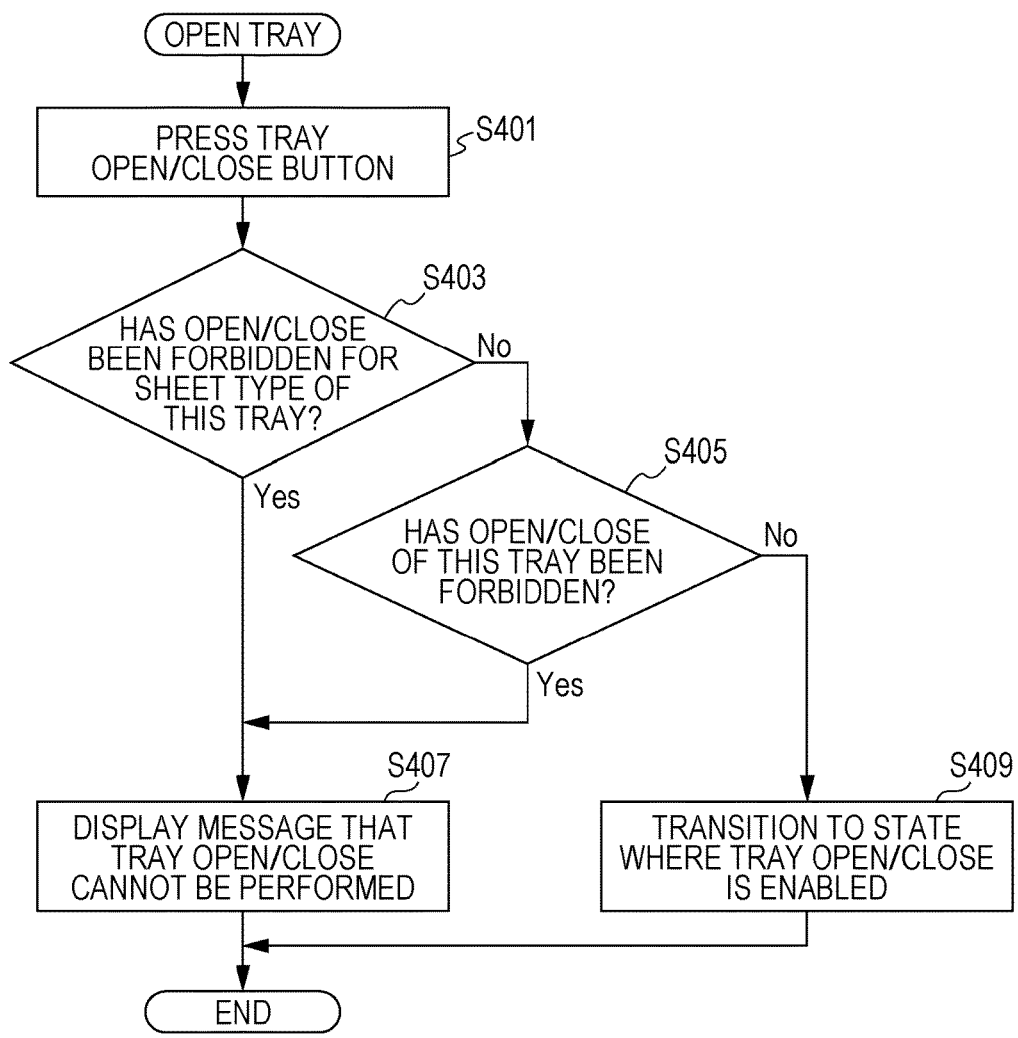
FIG. 13B is a flowchart for describing operations of a multifunction peripheral when a tray open/close button provided to each tray is pressed, according to the second embodiment of the present disclosure.

With reference to FIG. 13B, when a tray open/close button provided for each tray is pressed (step S401), if the tray open/close flag has been reset and indicates that tray open/close is forbidden (Yes in step S403), a message is displayed that tray open/close is not able to be performed (step S407). If the tray open/close flag has been set and indicates that tray open/close is permitted (No in step S403), and judgement is made that opening/closing of this tray has been forbidden based on the open/close permission information corresponding to the type of sheets loaded on this tray (Yes in step S405), a message is displayed that tray open/close is not able to be performed (step S407). If judgement is made that opening/closing of this tray has been permitted based on the open/close permission information corresponding to the type of sheets loaded on this tray (No in step S405), the state transitions to a state where open/close of this tray can be performed (step S409).

Figure 13C:
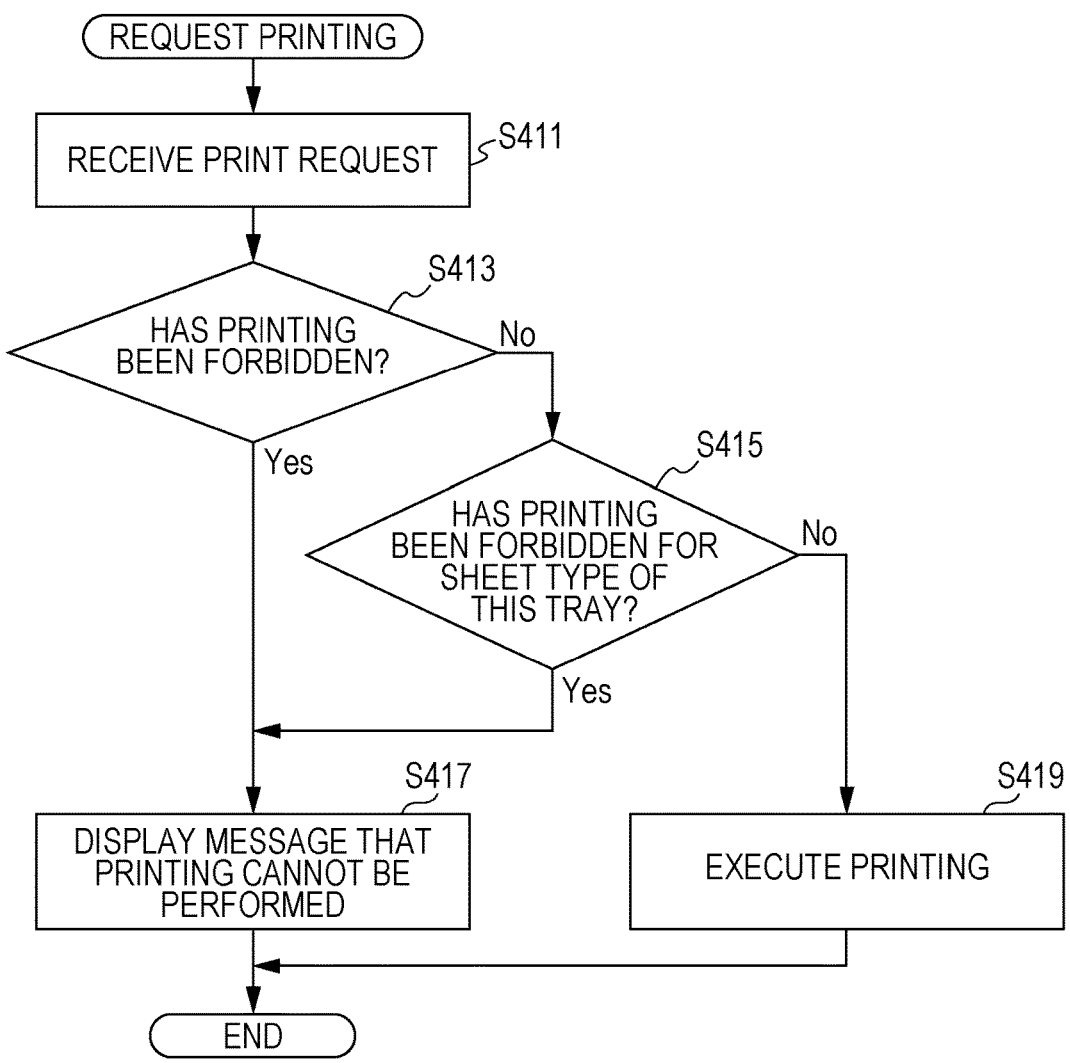
FIG. 13C is a flowchart for describing operations of a multifunction peripheral when a print request is received, according to the second embodiment of the present disclosure.

With reference to FIG. 13C, when receiving a print request (step S411), if the print flag has been reset and indicates that printing is forbidden (Yes in step S413), a message is displayed that printing is not able to be performed (step S417). If the print flag has been set and indicates that printing is permitted (No in step S413), and judgement is made that printing using sheets of this tray has been forbidden based on the print information corresponding to the type of sheets loaded on this tray (Yes in step S415), a message is displayed that printing is not able to be performed (step S417). If judgement is made that printing using sheets of this tray has been permitted based on the print permission information corresponding to the type of sheets loaded on this tray (No in step S415), printing using sheets of this tray is executed (step S419).

Operations of Third Embodiment

Figure 14A:
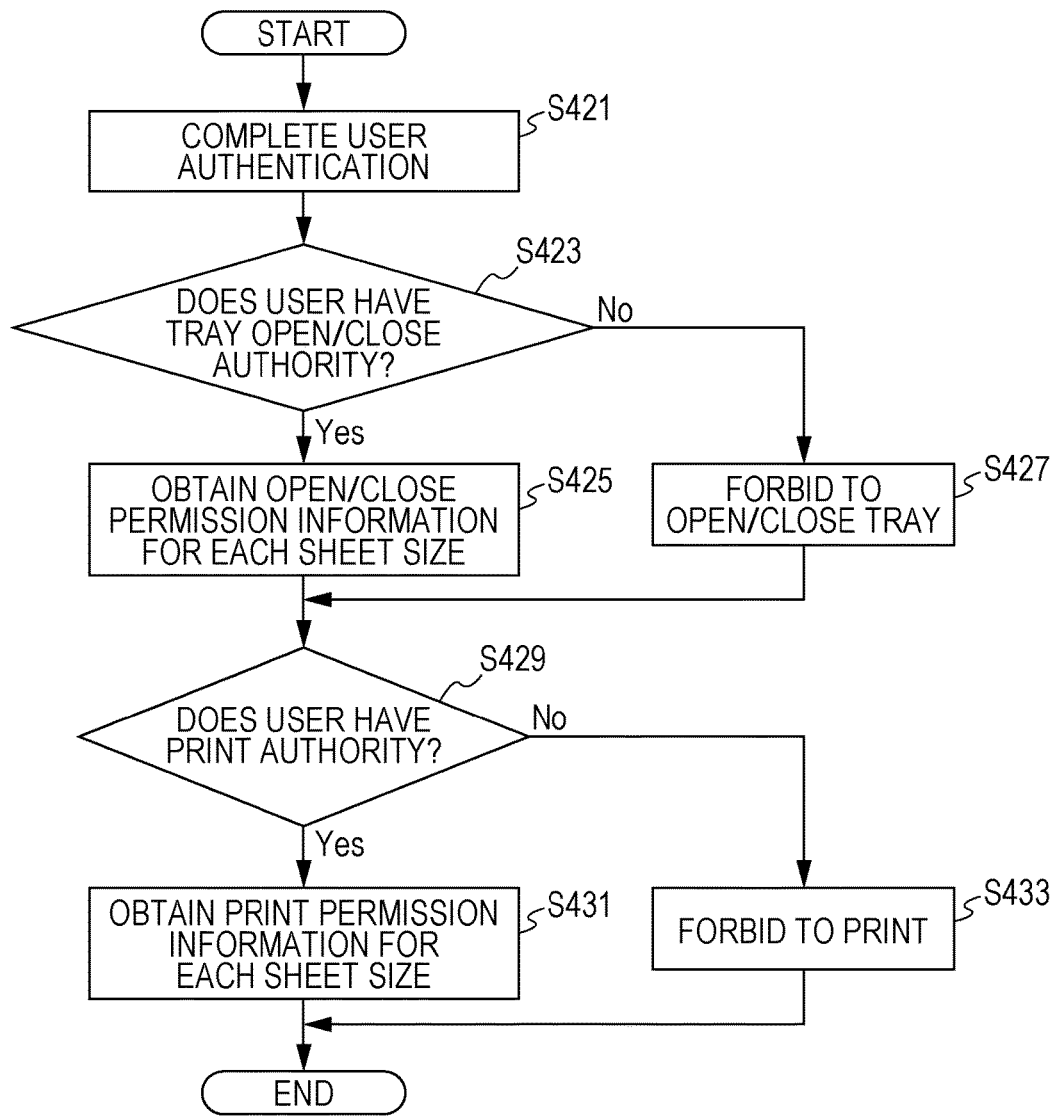
FIG. 14A is a flowchart for describing operations of a multifunction peripheral when a user logs in, according to the third embodiment of the present disclosure.

Next, operations in a case where users have tray open/close authority and print authority for individual sheet sizes will be described. With reference to FIG. 14A, upon user authentication having been completed (step S421), the authority table is searched based on the user ID, and if the user is a user that has tray open/close authority (Yes in step S423), a tray open/close flag is set, and thereafter open/close permission information for each sheet size is obtained (step S425), while if the user is a user that does not have tray open/close authority (No in step S423), the tray open/close flag is reset to forbit tray open/close (step S427). Next, if the user is a user that has print authority (Yes in step S429), print permission information is obtained to permit printing for each sheet size (step S431), while if the user is not a user that has print authority (No in step S429), the print flag is reset to forbid printing (step S433).

Figure 14B:
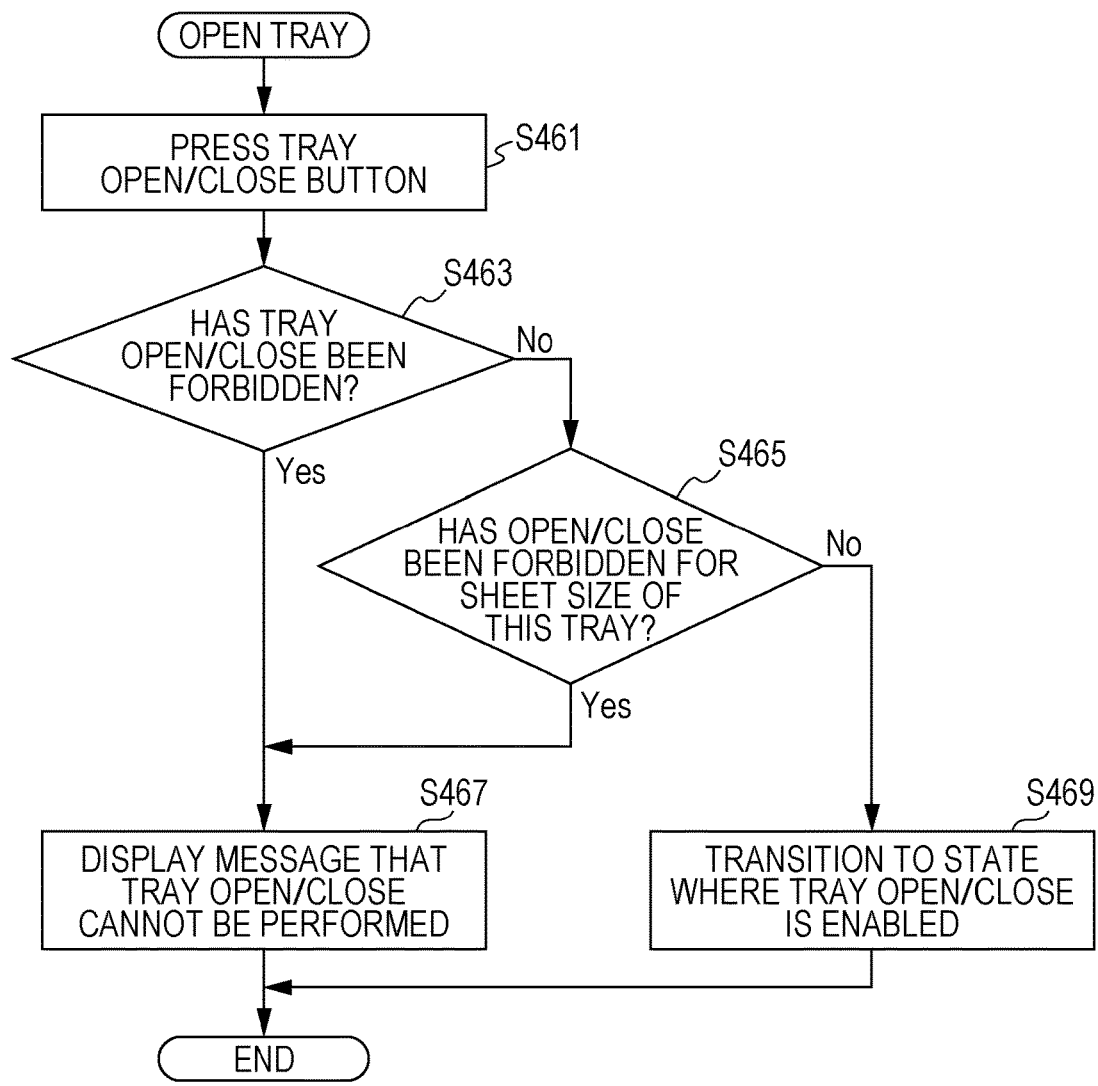
FIG. 14B is a flowchart for describing operations of a multifunction peripheral when a tray open/close button provided to each tray is pressed, according to the third embodiment of the present disclosure.

With reference to FIG. 14B, when a tray open/close button provided for each tray is pressed (step S461), if the tray open/close flag has been reset and indicates that tray open/close is forbidden (Yes in step S463), a message is displayed that tray open/close is not able to be performed (step S467). If the tray open/close flag has been set and indicates that tray open/close is permitted (No in step S463), and judgement is made that opening/closing of this tray has been forbidden based on the open/close permission information corresponding to the size of sheets loaded on this tray (Yes in step S465), a message is displayed that tray open/close is not able to be performed (step S467). If judgement is made that opening/closing of this tray has been permitted based on the open/close permission information corresponding to the size of sheets loaded on this tray (No in step S465), the state transitions to a state where the tray can be opened/closed (step S469).

Figure 14C:
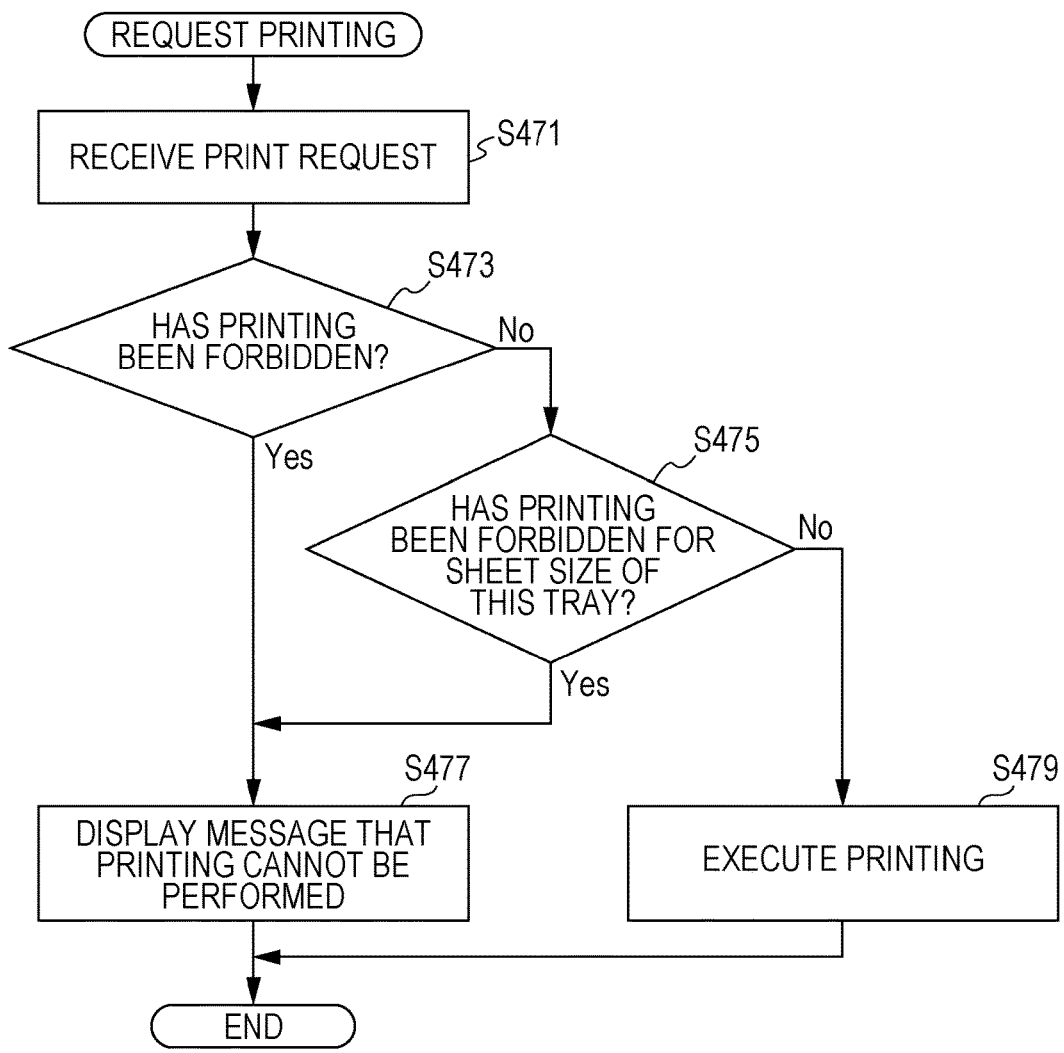
FIG. 14C is a flowchart for describing operations of a multifunction peripheral when a print request is received, according to the third embodiment of the present disclosure.

With reference to FIG. 14C, when receiving a print request (step S471), if the print flag has been reset and indicates that printing is forbidden (Yes in step S473), a message is displayed that printing is not able to be performed (step S477). If the print flag has been set and indicates that printing is permitted (No in step S473), and judgement is made that printing using sheets of this tray has been forbidden based on the print permission information corresponding to the size of sheets loaded on this tray (Yes in step S475), a message is displayed that printing is not able to be performed (step S477). If judgement is made that printing using sheets of this tray has been permitted based on the print permission information corresponding to the size of sheets loaded on this tray (No in step S475), printing using sheets of this tray is executed (step S479).

Operations of Fourth Embodiment

Figure 15:
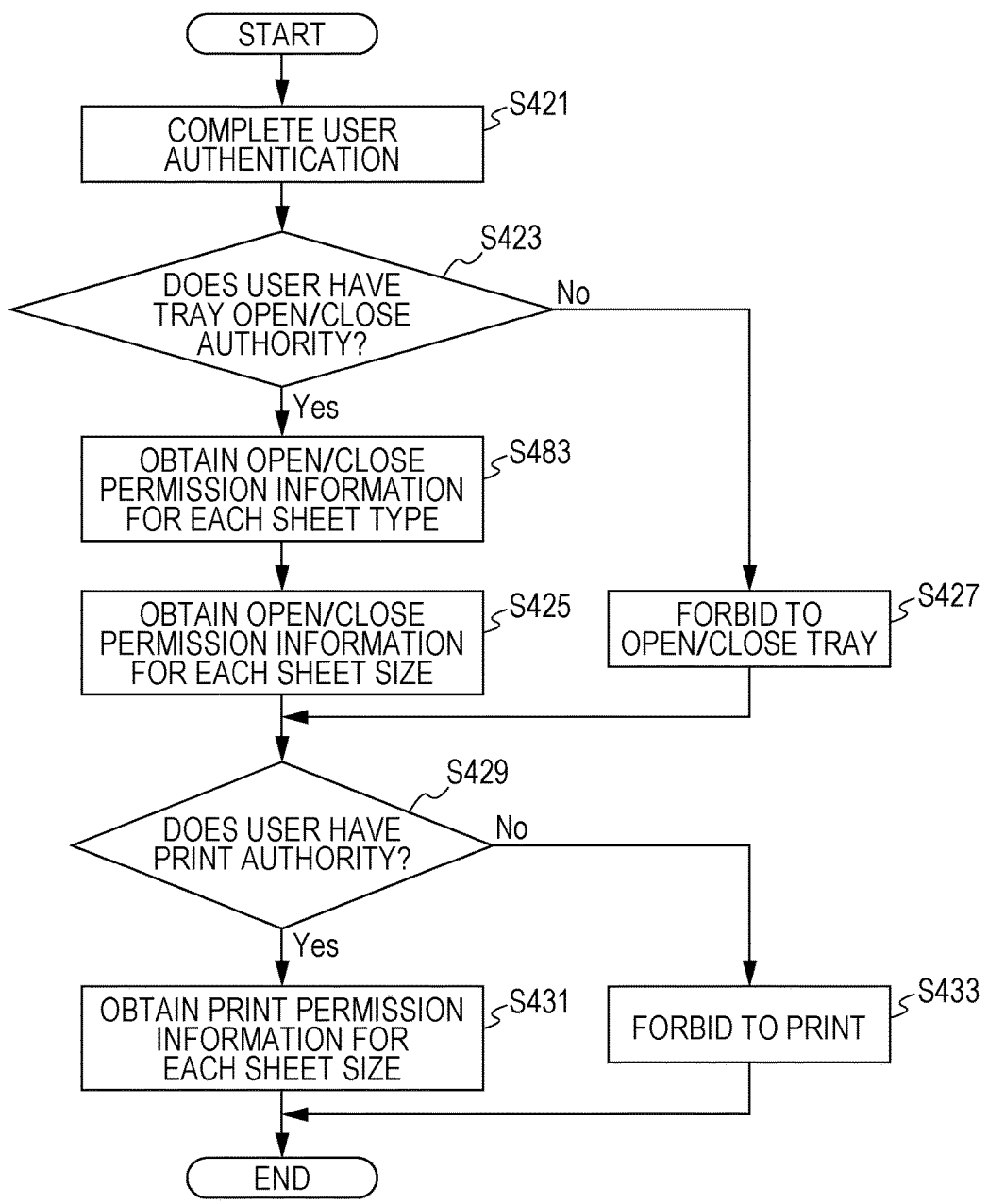
FIG. 15 is a flowchart for describing operations of a multifunction peripheral when a user logs in, according to the fourth and fifth embodiments of the present disclosure.

Next, an example of operations in a case where users have tray open/close authority and print authority for individual sheet types and individual sheet sizes will be described. With reference to FIG. 15, upon user authentication having been completed (step S421), the authority table is searched based on the user ID, and if the user is a user that has tray open/close authority (Yes in step S423), a tray open/close flag for permitting tray open/close is set, and thereafter open/close permission information for each sheet type and open/close permission information for each sheet size are obtained (steps S483 and S425), while if the user is a user that does not have tray open/close authority (No in step S423), the tray open/close flag is reset to forbit tray open/close (step S427). Next, if the user is a user that has print authority (Yes in step S429), print permission information is obtained to permit printing for each sheet size (step S431), while if the user is not a user that has print authority (No in step S429), the print flag is reset to forbid printing (step S433).

With reference to FIG. 14E, when the tray open/close button is pressed (step S461), if the tray open/close flag has been reset and indicates that tray open/close is forbidden (Yes in step S463), a message is displayed that tray open/close is not able to be performed (step S467). If the tray open/close flag has been set and indicates that tray open/close is permitted (No in step S463), and judgement is made that opening/closing of this tray has been forbidden based on the open/close permission information corresponding to the size of sheets loaded on this tray (Yes in step S465), a message is displayed that tray open/close is not able to be performed (step S467). If judgement is made that opening/closing of this tray has been permitted based on the open/close permission information corresponding to the type of sheets and the open/close permission information corresponding to the size of sheets loaded on this tray (No in step S465), the state transitions to a state where the tray can be opened/closed (step S469).

With reference to FIG. 14C, when receiving a print request (step S471), if the print flag has been reset and indicates that printing is forbidden (Yes in step S473), a message is displayed that printing is not able to be performed (step S477). If the print flag has been set and indicates that printing is permitted (No in step S473), and judgement is made that printing using sheets of this tray has been forbidden based on the print permission information corresponding to the size of sheets loaded on this tray (Yes in step S475), a message is displayed that printing is not able to be performed (step S477). If judgement is made that printing using sheets of this tray has been permitted based on the print permission information corresponding to the type of sheets loaded on this tray (No in step S475), printing using sheets of this tray is executed (step S479).

Operations of Fifth Embodiment

The operations of the fifth embodiment are similar to the operations of the fourth embodiment, but differ with regard to the following point. In step S465 in the fourth embodiment, judgement is made regarding whether or not opening/closing of the tray is permitted based on open/close permission information corresponding to the type of sheets and open/close permission information corresponding to the size of sheets loaded on the tray. In the fifth embodiment, with regard to trays where sheets of original sheet types are loaded, judgement is made regarding whether or not opening/closing of the tray is permitted based on open/close permission information corresponding to an original sheet type, instead of open/close permission information corresponding to the type of sheets and open/close permission information corresponding to the size of sheets loaded on the tray.

Operations of Sixth Embodiment

Figure 16:
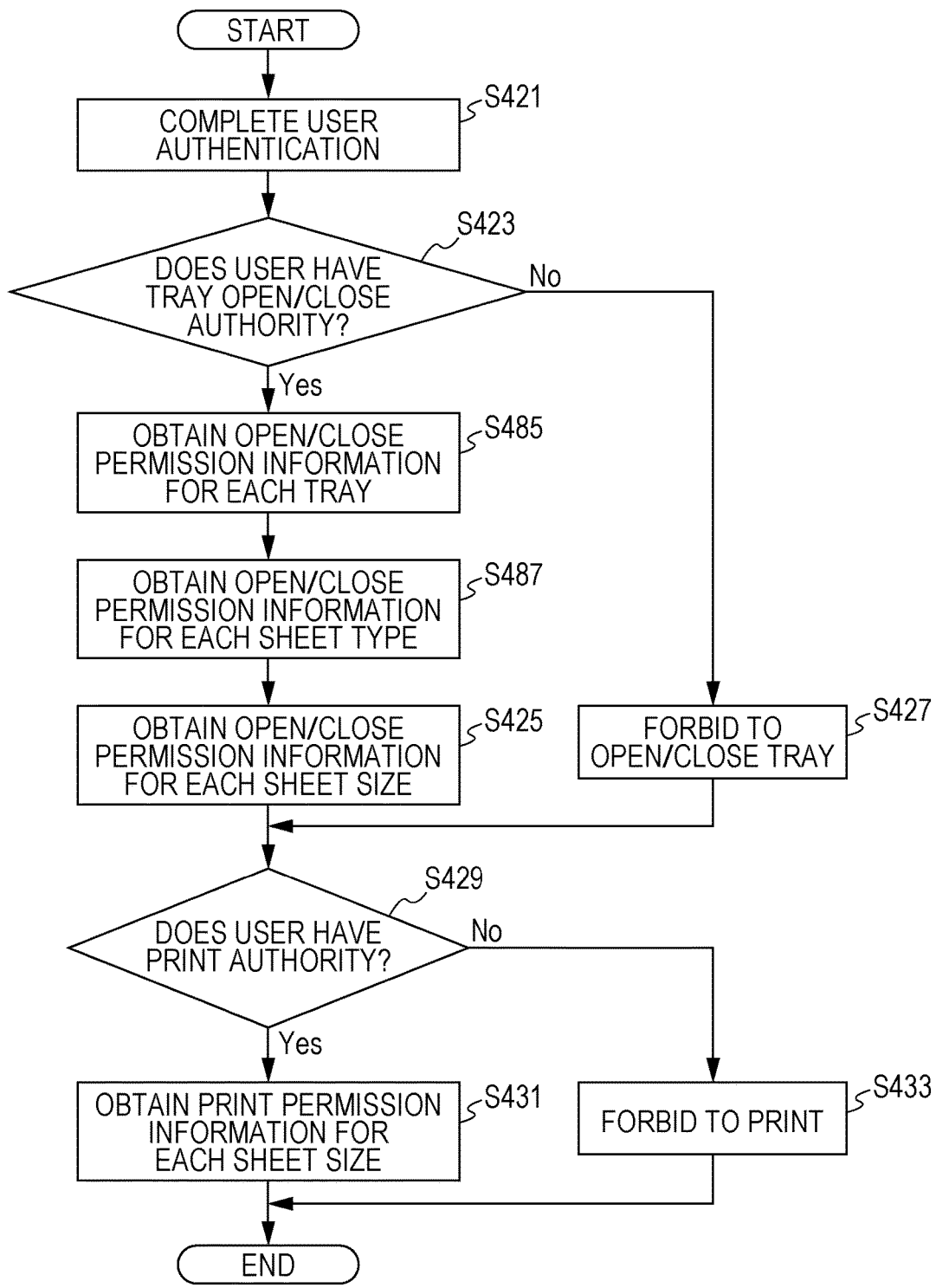
FIG. 16 is a flowchart for describing operations of a multifunction peripheral when a user logs in, according to the sixth and seventh embodiments of the present disclosure.

Next, another example of operations in a case where users have tray open/close authority and print authority for individual sheet sizes and individual sheet types will be described. With reference to FIG. 16, upon user authentication having been completed (step S421), the authority table is searched based on the user ID, and if the user is a user that has tray open/close authority (Yes in step S423), a tray open/close flag for permitting tray open/close is set, and thereafter open/close permission information for each tray, open/close permission information for each sheet type, and open/close information for each sheet size are obtained (steps S485, S487, and S425), while if the user is a user that does not have tray open/close authority (No in step S423), the tray open/close flag is reset to forbit tray open/close (step S427). Next, if the user is a user that has print authority (Yes in step S429), print permission information is obtained to permit printing for each sheet size (step S431), while if the user is not a user that has print authority (No in step S429), the print flag is reset to forbid printing (step S433).

With reference to FIG. 14B, when the tray open/close button is pressed (step S461), if the tray open/close flag has been reset and indicates that tray open/close is forbidden (Yes in step S463), a message is displayed that tray open/close is not able to be performed (step S467). If the tray open/close flag has been set and indicates that tray open/ close is permitted (No in step S463), and judgement is made that opening/closing of this tray has been forbidden based on the open/close permission information corresponding to the size of sheets loaded on this tray (Yes in step S465), a message is displayed that tray open/close is not able to be performed (step S467). If judgement is made that opening/closing of this tray has been permitted based on the open/close permission information for each tray, the open/close permission information for each sheet type corresponding to this tray, and the open/close permission information for each sheet size corresponding to this tray, (No in step S465), the state transitions to a state where the tray can be opened/closed (step S469).

With reference to FIG. 14C, when receiving a print request (step S471), if the print flag has been reset and indicates that printing is forbidden (Yes in step S473), a message is displayed that printing is not able to be performed (step S477). If the print flag has been set and indicates that printing is permitted (No in step S473), and judgement is made that printing using sheets of this tray has been forbidden based on the print permission information for each tray, the print permission information for each sheet type corresponding to this tray, and the print permission information for each sheet size corresponding to this tray, (Yes in step S475), a message is displayed that printing is not able to be performed (step S477). If judgement is made that printing using sheets of this tray has been permitted based on the print permission information for each tray, and the print permission information corresponding to the size of sheets and print permission information for each type of sheets loaded corresponding to tray (No in step S475), printing using sheets of this tray is executed (step S479).

Operations of Seventh Embodiment

The operations of the seventh embodiment are similar to the operations of the sixth embodiment, but differ with regard to the following point. In step S465 in the sixth embodiment, judgement is made regarding whether or not opening/closing of the tray is permitted based on the print permission information for each tray, the print permission information for each sheet type corresponding to this tray, and the print permission information for each sheet size corresponding to this tray. In the seventh embodiment, judgement is made regarding whether or not opening/closing of the tray is permitted based on open/close permission information corresponding to an original sheet type, instead of print permission information for each tray, and print permission information for the type of sheets corresponding to this tray and print permission information for the size of sheets corresponding to this tray.

Operations of Common Embodiment

Figure 17:
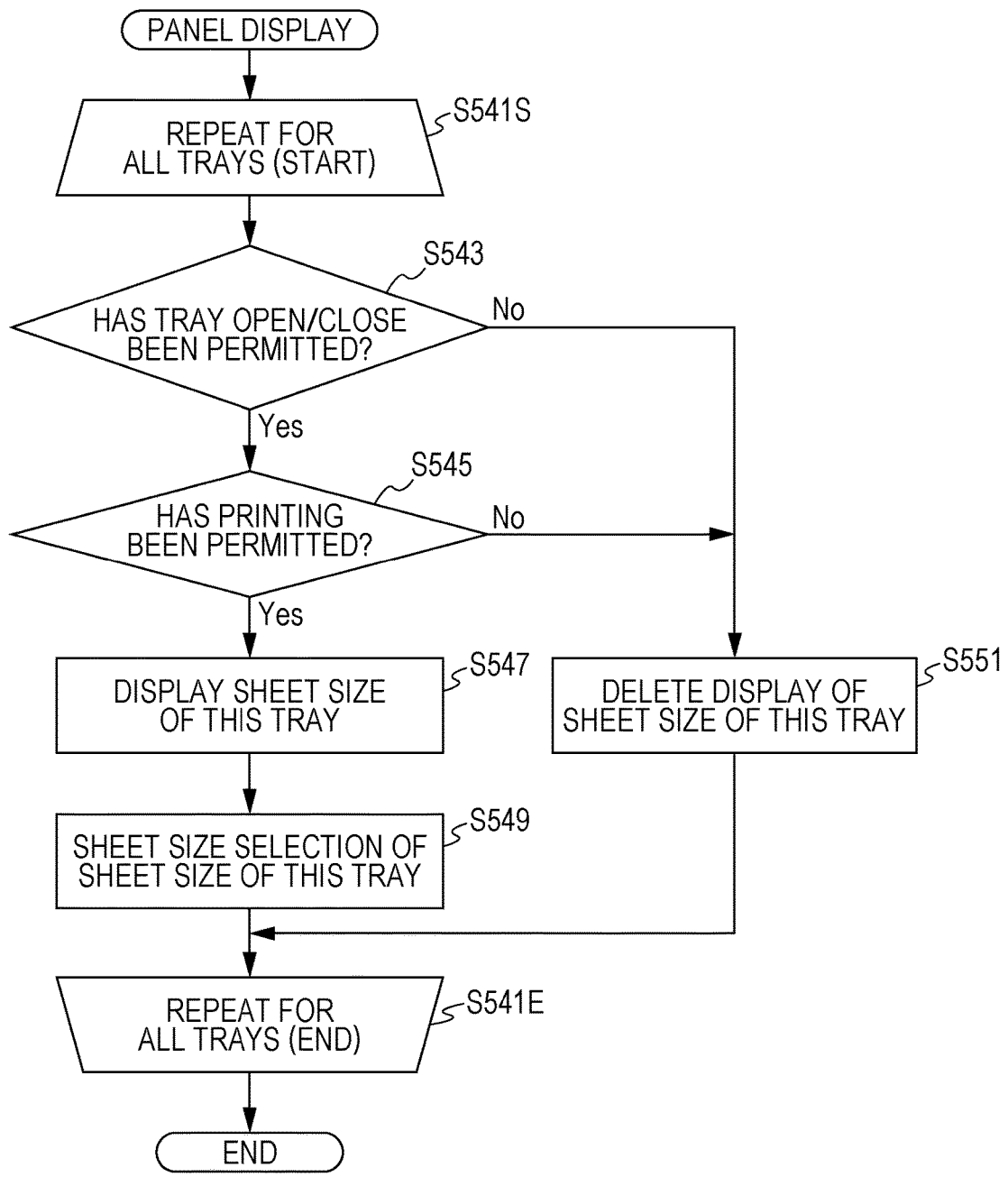
FIG. 17 is a flowchart for describing operation of controlling a screen display of sheet sizes of trays according to a common embodiment of the present disclosure.

Next, a method of control for displaying sheet sizes overlaid on the tray portions in the image of the multifunction peripheral displayed on the operating screen, and control for deciding which sheet sizes to display overlaid in the sheet size selection screen, will be described. With reference to FIG. 17, the following processing from step S541S through step S541E is repeated for all trays.

If tray open/close is permitted for a tray regarding which the current repetition is being performed (Yes in step S543), and printing is permitted as well (Yes in step S545), settings are made to display overlaid the size of sheets loaded on this tray at the portion of this tray displayed in the operating screen (step S547), and subsequently, the size of the sheets loaded on this tray is set as a sheet size that is selectable in the sheet size selection screen (step S549). Otherwise (No in step S543 or No in step S545), settings are made to not display the size of sheets loaded on this tray at the portion of this tray displayed in the operating screen (step S551). The sheet size set in step S549 as being a sheet size that is selectable is displayed as a selectable sheet size when actually displaying the sheet size selection screen.

Although omitted from illustration, an arrangement may be made where, if tray open/close is permitted for a tray regarding which the current repetition is being performed and printing is permitted as well, in the same way, settings are made to display overlaid the type of sheets loaded on this tray at the portion of this tray displayed in the operating screen, and subsequently the type of the sheets loaded on this tray is set as a sheet size that is selectable in the sheet type selection screen. Otherwise, settings are made to not display overlaid the type of sheets loaded on this tray at the portion of this tray displayed in the operating screen. In this case, the sheet type set as being a sheet type that is selectable is displayed as a selectable sheet type when actually displaying the sheet type selection screen.

Further, an arrangement may be made where, in a case where there are no sheets in a tray, or the actual size of sheets differs from the sheet size settings, that tray is unlocked.

Configuration of Common Embodiment

Figure 18:
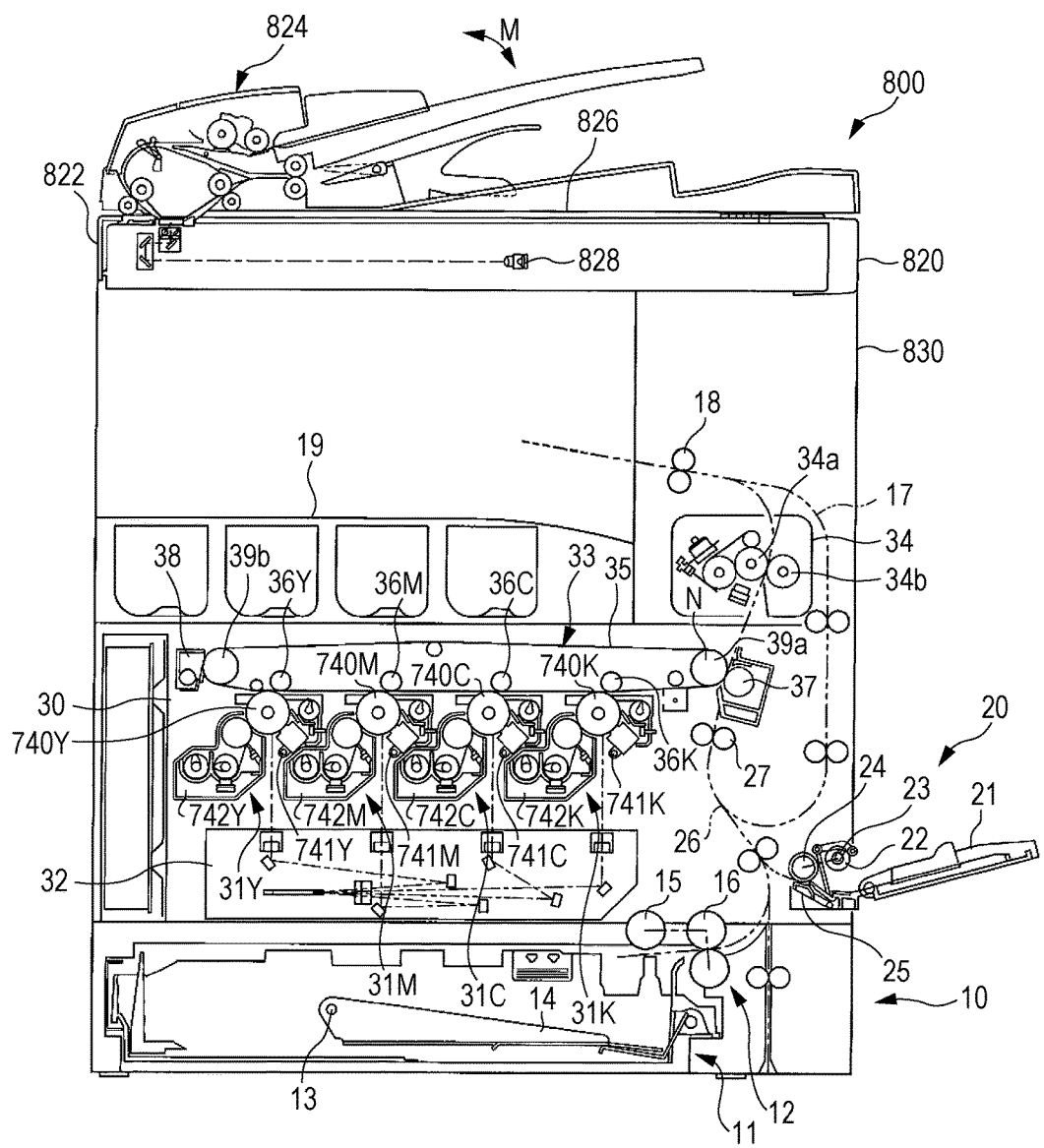
FIG. 18 is a conceptual cross-sectional diagram of a multifunction peripheral according to a common embodiment of the present disclosure.

FIGS. 18 and 19 illustrate the configuration and so forth of a multifunction peripheral 800 according to the common embodiment. The multifunction peripheral 800 has a document reader 820 that reads images from documents, a multifunction peripheral main unit (image forming unit main unit) 830, an operating panel unit 843 for operating the document reader 820 and multifunction peripheral main unit 830, and a computation processing unit 841 that controls the document reader 820 and multifunction peripheral main unit 830 based on operations made at the operating panel unit 843, as illustrated in FIGS. 18 and 19.

The document reader 820 may be used alone to read images, the multifunction peripheral main unit 830 may be used alone to form images, and these may be used cooperatively to copy images. The multifunction peripheral 800 may also include a storage device and facsimile device that are omitted from illustration. The storage device can store images read by the document reader 820 or image s received by the facsimile device. The facsimile device can transmit images read by the document reader 820 and images stored in the storage device, and can externally receive images. Further, the multifunction peripheral 800 may include an interface for connecting to a personal computer via a network. The personal computer connected to the multifunction peripheral 800 can use functions of the multifunction peripheral with regard to data that it can manage.

The document reader 820 has an automatic document feeder 824 that is a single-pass feeder (SPF) and a reader main unit 822 that reads images of documents. Note that the document reader 820 includes besides the components illustrated in FIG. 19, components that are not illustrated in FIG. 19 but are illustrated in FIG. 18. The reader main unit 822 also includes a platen 826, as illustrated in FIG. 18.

The multifunction peripheral main unit 830 includes a sheet feeding unit 10 that feeds sheets, a manual sheet feed unit 20 capable of manually feeding sheets, and an image forming unit 30 that forms images on sheets fed by the sheet feeding unit 10 or manual sheet feed unit 20.

The sheet feeding unit 10 has a sheet loading unit 11 where sheets are loaded, and a separating-and-feeding unit 12 that separates and feeds sheets loaded on the sheet loading unit 11, one at a time. The sheet loading unit 11 has an intermediate plate 14 that pivots on a rotation shaft 13, and the intermediate plate 14 pivots when feeding sheets to raise the sheets upwards. The separating-and-feeding unit 12 has a pickup roller 15 that feeds sheets raised by the intermediate plate 14, and a separating roller pair 16 that separates sheets fed by the pickup roller 15 into individual sheets.

The control unit 20 has a manual feed tray #21 on which sheets can be loaded, and a separating-and-feeding unit 22 that separates and feeds sheets loaded on the manual feed tray #21 one at a time. The manual feed tray #21 is pivotably supported by the multifunction peripheral main unit 830, and sheets can be loaded thereupon by fixing to a predetermined angle when performing manual sheet feeding. The separating-and-feeding unit 22 has a pickup roller 23 that feeds sheets loaded on the manual feed tray #21, and a separating roller 24 and separating pad 25 that separates the sheets fed by the pickup roller 23 into individual sheets.

The image forming unit 30 has four process cartridges 31Y through 31K that form images of yellow (Y), magenta (M), cyan (C), and black (K), later-described photosensitive drums 740Y through 740K, an exposing device 32 that exposes the surfaces of the photosensitive drums 740Y through 740K, a transfer unit 33 that transfers toner images formed on the surfaces of the photosensitive drums 740Y through 740K onto sheets, and a fixing unit 34 that fixes the transferred toner images onto the sheets. Note that the letters (Y, M, C, K) appended to the reference numerals indicate the respective colors (yellow, magenta, cyan, black).

The four process cartridges 31Y through 31K are configured to be detachable from the multifunction peripheral main unit 830 and be replaced. Note that the four process cartridges 31Y through 31K are of the same configuration other than the color of images that are formed, so description will be made regarding the configuration of the process cartridge 31Y that forms yellow (Y) images, and description of the process cartridges 31M through 31K will be omitted.

The process cartridge 31Y includes the photosensitive drum 740Y that serves as an image bearing member, a charging unit 741Y that charges the photosensitive drum 740Y, a developing device 742Y that develops electrostatic latent images formed on the photosensitive drum 740Y, and a drum cleaner that removes residual toner from the surface of the photosensitive drum 740Y. The developing device 742Y includes a developing device main unit (not illustrated in detail) that develops the photosensitive drum 740Y and a toner cartridge (not illustrated in detail) that supplies toner to the developing device main unit. The toner cartridge is configured so as to be detachable mounted to the developing device main unit, and can be removed from the developing device main unit and replaced when toner accommodated therein is spent.

The exposing device 32 has a light source (omitted from illustration) that emits laser beams, and multiple mirrors (omitted from illustration) that guide the laser beams to the photosensitive drums 740Y through 740K. The transfer unit 33 has an intermediate transfer belt 35 that bears toner images formed at the photosensitive drums 740Y through 740K, primary transfer rollers 36Y through 36K that perform primary transfer of the toner images formed on the photosensitive drums 740Y through 740K onto the intermediate transfer belt 35, a secondary transfer roller 37 that performs secondary transfer of toner images, transferred onto the intermediate transfer belt 35, onto sheets, and a belt cleaner 38 that removes residual toner from the intermediate transfer belt 35. The intermediate transfer belt 35 runs over a driving roller 39a and a slave roller 39b, and is pressed against the photosensitive drums 740Y through 740K by the primary transfer rollers 36Y through 36K. The secondary transfer roller 37 nips the intermediate transfer belt 35 between itself and the driving roller 39a, and transfers toner images borne by the intermediate transfer belt 35 onto sheets at a nip portion N. The fixing unit 34 has a heating roller 34a that heats sheets, and a pressuring roller 34b that is pressed against the heating roller 34a.

The operating panel unit 843 has a display unit 845 that displays predetermined information, and an input unit 847 for input of instructions by the user to the document reader 820 and multifunction peripheral main unit 830. In the present embodiment, the operating panel unit 843 is situated at the front side of the reader main unit 822. Note that the front side corresponds to the near side at the plane of the drawing in FIG. 18, and the rear side corresponds to the far side in FIG. 18.

The computation processing unit 841 includes a CPU 841a that performs driving control of the sheet feeding unit 10, manual sheet feed unit 20, image forming unit 30, and document reader 820, and memory 841b that stores various types of programs for operating the CPU 841a and various types of information and so forth that the CPU 841a uses, as illustrated in FIG. 19. The computation processing unit 841 centrally controls the operations of the sheet feeding unit 10, manual sheet feed unit 20, image forming unit 30, and document reader 820, based on user operations at the operating panel unit 843, and forms images on sheets.

Next, image forming operations by the multifunction peripheral 800 configured as described above (image forming control by the computation processing unit 841) will be described. In the present embodiment, description will be made by way of an example of image forming operations, where images of documents to be read, fed by the automatic document feeder 824 and read by the reader main unit 822, are formed by the image forming unit 30 on sheets fed by the sheet feeding unit 10.

Upon an image forming start signal being emitted by user input at the input unit 847 of the operating panel 843, a document to be read, that is loaded on the automatic document feeder 824 by the user, is automatically fed toward a document reading position, and an image is read by the reader main unit 822 at the document reading position.

Upon an image of a document having been read by the reader main unit 822, the exposing device 32 emits multiple laser beams toward the photosensitive drums 740Y through 740K, corresponding to each, based on the image information of the document that has been read. The photosensitive drums 740Y through 740K have been charged beforehand by the charging units 741Y through 741K, and respective electrostatic latent images are formed on the photosensitive drums 740Y through 740K by being irradiated by the corresponding laser beams. Subsequently, the electrostatic latent images formed on the photosensitive drums 740Y through 740K are developed by the respective developing devices 742Y through 742K, and toner images of yellow (Y), magenta (M), cyan (C), and black (K) are formed on the photosensitive drums 740Y through 740K. The toner images of the respective colors formed on the photosensitive drums 740Y through 740K are transferred overlaid on the intermediate transfer belt 35 by the primary transfer rollers 36Y through 36K, and the toner image that has been transferred overlaid (full-color toner image) is conveyed to the nip portion N, borne by the intermediate transfer belt 35.

In conjunction with the above-described image forming operations, sheets loaded on the sheet loading unit 11 are separated into individual sheets by the separating-and-feeding unit 12 and fed to a sheet conveyance path 26 by the pickup roller 15. Skewing of sheets is corrected by a register roller pair 27 upstream of the nip portion N in the direction of conveyance of sheets, and the sheets are conveyed to the nip portion N at a predetermined conveyance timing. The full-color toner image borne by the intermediate transfer belt 35 is transferred by the secondary transfer roller 37 onto a sheet conveyed to the nip portion N.

The sheet onto which the toner image has been transferred is heated and pressurized at the fixing unit 34, whereby the toner image is fused, and the sheet is discharged to outside of the device by a discharge roller pair 18. Sheets discharged to the outside of the device are loaded on a discharged sheet loading portion 19.

Note that in a case where images are to be formed on both faces of a sheet (first face and second face), the discharge roller pair 18 is rotated in reverse before the sheet on which an image has been formed on the first face is discharged to outside of the device, so as to convey the sheet to a duplex conveyance path 17, and convey the sheet to the image forming unit 30 again over the duplex conveyance path 17. An image is formed on the second face in the same way as on the first face, and the sheet is discharged to outside of the device. The sheet discharged to the outside of the device is loaded on the discharged sheet loading portion 19.

Note that the above-described image forming device can be realized by hardware, software, or a combination thereof. The control method of the above-described image forming device can also be realized by hardware, software, or a combination thereof. The term realized by software means to be realized by a computer reading in and executing a program.

Programs can be stored in various types of non-transitory computer readable media, and supplied to a computer. Non-transitory computer readable media include various types of tangible storage media. Examples of non-transitory computer readable media include magnetic recording media (e.g., flexible disks, magnetic tape, hard disk drives), magneto-optical recording media (e.g., magneto-optical discs), compact disc (CD) read-only memory (ROM), CD-read (R), CD-read/write (R/W), and semiconductor memory (e.g., mask EON, programmable ROM (PROM), erasable PROM (EPROM), flash ROM, random access memory (RAM)). Programs can also be stored in various types of transitory computer readable media, and supplied to a computer. Examples of transitory computer readable media include electric signals, light signals, and electromagnetic waves. Transitory computer readable media can supply programs to a computer via cabled communication paths such as electric wires, optical fiber, and so forth, or via wireless communication paths.

According to the present embodiment, users do not have to carry keys for unlocking trays.

Also, control of permitting/forbidding of tray opening/closing and permitting/forbidding of printing can be easily performed by user authentication.

Further, in a case where sizes and types of sheets loaded on trays are changed, permitting/forbidding of tray opening/closing and permitting/forbidding of printing regarding these trays can be switched accordingly.

Control of permitting/forbidding of tray opening/closing and permitting/forbidding of printing can be switched according to the user. Further, after having made settings for each user for this control, the settings can be changed at a later time.

The present disclosure can be carried out in various forms without departing from the spirit and features thereof. Accordingly, the above-described embodiments should be understood to be only exemplary, and should not be interpreted restrictively. The scope of the present disclosure is laid forth in the Claims, and is not restricted by the text of the Specification in any way. Further, it should be noted that all modifications and alterations made within a scope equivalent to the scope of the Claims are encompassed by the scope of the present disclosure.

The present disclosure is applicable to control of permitting/forbidding of tray opening/closing in an image forming device. The present disclosure is also applicable to control of permitting/forbidding of printing in an image forming device.

The present disclosure contains subject matter related to that disclosed in Japanese Priority Patent Application JP 2017-222859 filed in the Japan Patent Office on Nov. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming device, comprising:
   a print permitting/forbidding controller configured to decide actual permitting/forbidding regarding printing regarding each of sheet feed trays, based on any one of, or a combination of any two or more of, settings of permitting/forbidding printing with regard to each sheet feed tray, settings of permitting/forbidding printing with regard to each sheet size, and settings of permitting/forbidding printing with regard to each sheet type, and
   a sheet feed tray open/close permitting/forbidding controller configured to decide actual permitting/forbidding regarding sheet feed tray open/close regarding each of sheet feed trays, based on any one of, or a combination of any two or more of, settings of permitting/forbidding tray opening/closing with regard to each sheet feed tray, settings of permitting/forbidding tray opening/closing with regard to each sheet size, and settings of permitting/forbidding tray opening/closing with regard to each sheet type,
   wherein at least part of settings used by the print permitting/forbidding controller to decide actual permitting/forbidding regarding printing, out of the settings of permitting/forbidding printing with regard to each sheet feed tray, settings of permitting/forbidding printing with regard to each sheet size, and settings of permitting/forbidding printing with regard to each sheet type, can be made to differ for each user, and
   wherein at least part of settings used by the sheet feed tray open/close permitting/forbidding controller to decide actual permitting/forbidding regarding tray opening/closing, out of the settings of permitting/forbidding tray opening/closing with regard to each sheet feed tray, settings of permitting/forbidding tray opening/closing with regard to each sheet size, and settings of permitting/forbidding tray opening/closing with regard to each sheet type, can be made to differ for each user.

2. The image forming device according to claim 1, wherein, in a case of deciding actual permitting/forbidding regarding printing, based on a combination of any two or more of the settings of permitting/forbidding printing with regard to each sheet feed tray, settings of permitting/forbidding printing with regard to each sheet size, and settings of permitting/forbidding printing with regard to each sheet type, the print permitting/ forbidding controller decides to permit actual printing if all of the settings used for deciding are set to permitting.

3. The image forming device according to claim 1, wherein, regarding sheets of an original sheet type, settings of permitting/forbidding printing with regard to the original sheet type are used instead of both the settings of permitting/forbidding printing with regard to each sheet size and settings of permitting/forbidding printing with regard to each sheet type.

4. The image forming device according to claim 1, wherein, in a case of deciding actual permitting/forbidding regarding tray opening/closing, based on a combination of any two or more of the settings of permitting/forbidding tray opening closing with regard to each sheet feed tray, settings of permitting/forbidding tray opening/closing with regard to each sheet size, and settings of permitting/forbidding tray opening/closing with regard to each sheet type, the sheet feed tray open/close permitting/forbidding controller decides to permit actual sheet feed tray open/close if all of the settings used for deciding are set to permitting.

5. The image forming device according to claim 1, wherein, regarding sheets of an original sheet type, settings of permitting/forbidding tray opening/closing with regard to the original sheet type are used instead of both the settings of permitting/forbidding tray opening/closing with regard to each sheet size and settings of permitting/forbidding tray opening/closing with regard to each sheet type.

6. The image forming device according to claim 1, further comprising:
a display controller configured to control whether or not to display, on a screen displaying trays, a size of a sheet assigned to a certain tray, based on whether or not permission for actual printing has been decided and whether or not permission for actual sheet feed tray open/close has been decided for each tray.

7. The image forming device according to claim 1, further comprising:
a display controller configured to display, in a sheet size selecting screen, a display for a sheet size regarding which permission to print has been decided, enabling the sheet size to be selected, and displaying a display for a sheet size regarding which forbidding to print has been decided, not enabling the sheet size to be selected.

8. The image forming device according to claim 1, further comprising:
a display controller configured to display, in a sheet type selecting screen, a display for a sheet type regarding which permission to print has been decided, enabling the sheet type to be selected, and displaying a display for a sheet type regarding which forbidding to print has been decided, not enabling the sheet type to be selected.

9. An image forming device, comprising:
a sheet feed tray open/close permitting/forbidding controller configured to decide actual permitting/forbidding regarding sheet feed tray open/close regarding each of sheet feed trays, based on any one of, or a combination of any two or more of, settings of permitting/forbidding tray opening/closing with regard to each sheet feed tray, settings of permitting/forbidding tray opening/closing with regard to each sheet size, and settings of permitting/forbidding tray opening/closing with regard to each sheet type,
wherein at least part of settings used by the sheet feed tray open close permitting/forbidding controller to decide actual permitting/forbidding regarding tray opening/closing, out of the settings of permitting/forbidding tray opening/closing with regard to each sheet feed tray, settings of permitting/forbidding tray opening/closing with regard to each sheet size, and settings of permitting/forbidding tray opening/closing with regard to each sheet type, can be made to differ for each user.

10. The image forming device according to claim 9, wherein, in a case of deciding actual permitting/forbidding regarding tray opening/closing, based on a combination of any two or more of the settings of permitting/forbidding tray opening/closing with regard to each sheet feed tray, settings of permitting/forbidding tray opening/closing with regard to each sheet size, and settings of permitting/forbidding tray opening/closing with regard to each sheet type, the sheet feed tray open/close permitting/forbidding controller decides to permit actual sheet feed tray open/close if all of the settings used for deciding are set to permitting.

11. The image forming device according to claim 9, wherein, regarding sheets of an original sheet type, settings of permitting/forbidding tray opening/closing with regard to the original sheet type are used instead of both the settings of permitting/forbidding tray opening/closing with regard to each sheet size and settings of permitting/forbidding tray opening/closing with regard to each sheet type.

12. A multifunction peripheral, comprising:
the image forming device according to claim 1.

13. A non-transitory computer readable storage medium, storing a program causing a computer to function as the image forming device according to claim 1.

14. A control method of an image forming device, the method comprising:
controlling of print permitting/forbidding, in which is decided actual permitting/forbidding regarding printing regarding each of sheet feed trays, based on any one of, or a combination of any two or more of, settings of permitting forbidding printing with regard to each sheet feed tray, settings of permitting/forbidding printing with regard to each sheet size, and settings of permitting forbidding printing with regard to each sheet type, and
controlling of a sheet feed tray open/close permitting/forbidding, in which is decided actual permitting/forbidding regarding sheet feed tray open/close regarding each of sheet feed trays, based on any one of, or a combination of any two or more of, settings of permitting/forbidding tray opening/closing with regard to each sheet feed tray, settings of permitting/forbidding tray opening/closing with regard to each sheet size, and settings of permitting/forbidding tray opening/closing with regard to each sheet type,
wherein at least part of settings used in the controlling of print permitting/forbidding to decide actual permitting/forbidding regarding printing, out of the settings of permitting/forbidding printing with regard to each sheet feed tray, settings of permitting/forbidding printing with regard to each sheet size, and settings of permitting/forbidding printing with regard to each sheet type, can be made to differ for each user, and
wherein at least part of settings used by the sheet feed tray open/close permitting/forbidding to decide actual permitting/forbidding regarding tray opening/closing, out of the settings of permitting/forbidding tray opening/closing with regard to each sheet feed tray, settings of permitting/forbidding tray opening/closing with regard to each sheet size, and settings of permitting/forbidding tray opening/closing with regard to each sheet type, can be made to differ for each user.

15. A control method of an image forming device, the method comprising:

controlling of sheet feed tray open/close permitting/forbidding, in which is decided actual permitting forbidding regarding sheet feed tray open/close regarding each of sheet feed trays, based on any one of, or a combination of any two or more of, settings of permitting forbidding tray opening closing with regard to each sheet feed tray, settings of permitting/forbidding tray opening/closing with regard to each sheet size, and settings of permitting/forbidding tray opening/closing with regard to each sheet type, wherein at least part of settings used in the controlling of sheet feed tray open/close permitting/forbidding controller to decide actual permitting/forbidding regarding tray opening closing, out of the settings of permitting/forbidding tray opening/closing with regard to each sheet feed tray, settings of permitting/forbidding tray opening/closing with regard to each sheet size, and settings of permitting/forbidding tray opening/closing with regard to each sheet type, can be made to differ for each user.

* * * * *